(12) United States Patent
Egolf et al.

(10) Patent No.: US 11,235,869 B2
(45) Date of Patent: Feb. 1, 2022

(54) SEALED HUB AND SHAFT FAIRING FOR ROTARY WING AIRCRAFT

(71) Applicant: SIKORSKY AIRCRAFT CORPORATION, Stratford, CT (US)

(72) Inventors: Thomas Alan Egolf, Glastonbury, CT (US); Robert D. Beatty, Trumbull, CT (US); Gary Law, Shelton, CT (US); Chris P. Butler, Frisco, TX (US); Eric Lucien Nussenblatt, Stamford, CT (US); Edward Reed, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 43 days.

(21) Appl. No.: 16/832,307

(22) Filed: Mar. 27, 2020

(65) Prior Publication Data
US 2020/0223536 A1 Jul. 16, 2020

Related U.S. Application Data

(63) Continuation of application No. 15/509,422, filed as application No. PCT/US2015/053530 on Oct. 1, 2015, now abandoned.

(60) Provisional application No. 62/058,153, filed on Oct. 1, 2014, provisional application No. 62/058,424, filed on Oct. 1, 2014.

(51) Int. Cl.
*B64C 27/10* (2006.01)
*B64C 7/00* (2006.01)

(52) U.S. Cl.
CPC ............. *B64C 27/10* (2013.01); *B64C 7/00* (2013.01)

(58) Field of Classification Search
CPC .................... B64C 27/10; B64C 7/00
See application file for complete search history.

(56) References Cited

U.S. PATENT DOCUMENTS

| 330,182 A | 11/1885 | Wilcox |
| 330,408 A | 11/1885 | Stephen |
| 330,500 A | 11/1885 | Lee |
| 330,501 A | 11/1885 | Mathee |
| 330,525 A | 11/1885 | Feancis |
| 330,535 A | 11/1885 | Donlon |
| 330,557 A | 11/1885 | Bbown |

(Continued)

OTHER PUBLICATIONS

International Search Report and Written Opinion for International Application No. PCT/US2015/053479; International Filing Date Oct. 1, 2016; dated Feb. 23, 2016 (pp. 1-11).

(Continued)

*Primary Examiner* — Jessica B Wong
(74) *Attorney, Agent, or Firm* — Michael Best & Friedrich LLP

(57) ABSTRACT

An aircraft includes an airframe, an extending tail, a counter rotating, coaxial main rotor assembly including an upper rotor assembly and a lower rotor assembly, and a translational thrust system positioned at the extending tail. The translational thrust system provides translational thrust to the airframe. An upper hub fairing is positioned at the upper rotor assembly. A lower hub fairing is positioned at the lower rotor assembly. A shaft fairing is disposed between the upper hub fairing and the lower hub fairing. The upper hub fairing is substantially sealed to the shaft fairing and the lower hub fairing is substantially sealed to the shaft fairing.

10 Claims, 21 Drawing Sheets

(56) References Cited

U.S. PATENT DOCUMENTS

| | | | |
|---|---|---|---|
| 330,567 A | 11/1885 | Da Vies | |
| 1,467,648 A * | 9/1923 | Pateras | B64C 27/10 |
| | | | 416/127 |
| 2,727,832 A | 12/1955 | Christensen et al. | |
| 3,217,811 A | 11/1965 | Hibyan et al. | |
| 3,310,120 A | 3/1967 | Vacca | |
| 3,331,444 A | 7/1967 | Toner | |
| 3,409,249 A | 11/1968 | Bergquist | |
| 6,086,975 A | 7/2000 | Brick et al. | |
| 7,530,787 B2 | 5/2009 | Bertolotti et al. | |
| 7,530,790 B2 | 5/2009 | Cabrera et al. | |
| 7,621,480 B2 | 11/2009 | Darrow, Jr. et al. | |
| 2005/0151001 A1 | 7/2005 | Loper | |
| 2006/0269411 A1 | 11/2006 | Bertolotti et al. | |
| 2006/0269413 A1 | 11/2006 | Cotton et al. | |
| 2007/0181741 A1 | 8/2007 | Darrow et al. | |
| 2009/0084891 A1 * | 4/2009 | Darrow, Jr. | B64C 27/12 |
| | | | 244/17.19 |
| 2012/0175461 A1 | 7/2012 | Van der Westhuizen et al. | |
| 2014/0030103 A1 | 1/2014 | Matalanis et al. | |
| 2014/0091172 A1 | 4/2014 | Arlton et al. | |
| 2014/0096501 A1 | 4/2014 | Pantalone, III et al. | |
| 2014/0314573 A1 | 10/2014 | Mayrides et al. | |
| 2015/0028597 A1 | 1/2015 | Eller et al. | |
| 2015/0102158 A1 * | 4/2015 | Wittmer | B64C 27/57 |
| | | | 244/17.13 |
| 2017/0305543 A1 | 10/2017 | Moffitt et al. | |

OTHER PUBLICATIONS

International Search Report and Written Opinion for International Application No. PCT/US15/53530; International Filing Date Oct. 1, 2015; dated Mar. 4, 2016 (pp. 1-11).

International Preliminary Report on Patentability for International Application No. PCT/US15/53530; International Filing Date Oct. 1, 2014; dated Apr. 13, 2017 (pp. 1-6).

International Preliminary Report on Patentability for International Application No. PCT/US2015/053479; International Filing Date Oct. 1, 2014; dated Apr. 13, 2017 (pp. 1-6).

European Search Report for European Application No. 15845792.9; dated Apr. 20, 2018 (pp. 1-8).

\* cited by examiner

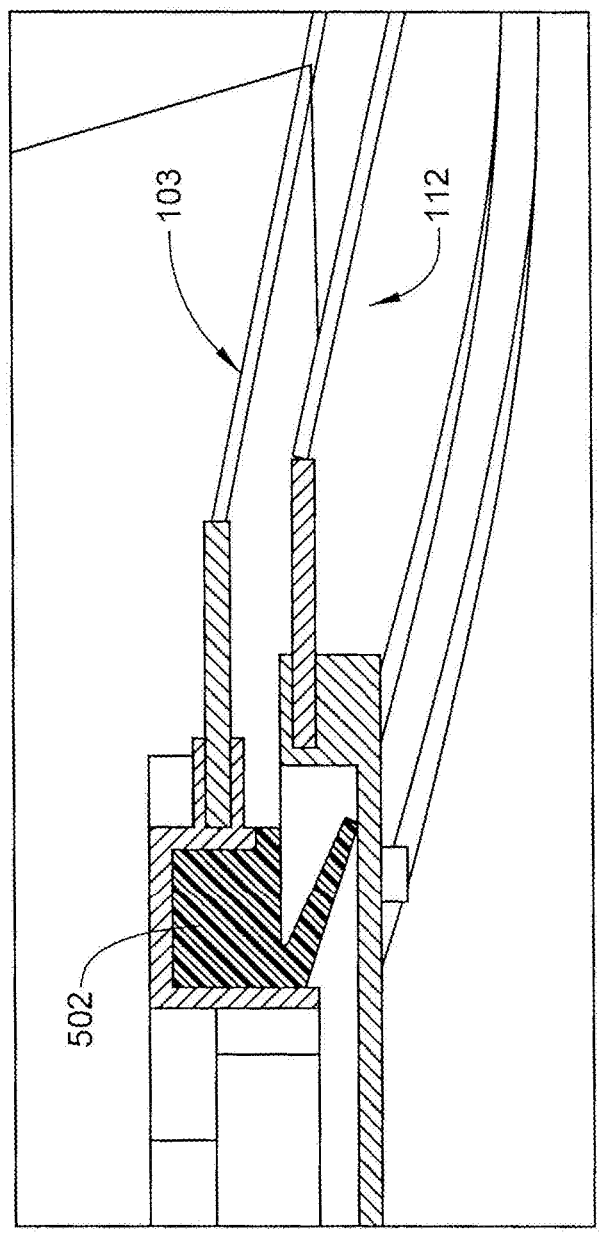

SEALED HUB AND SHAFT FAIRING FOR ROTARY WING AIRCRAFT

CROSS-REFERENCE TO RELATED APPLICATIONS

The present application is a continuation of U.S. patent application Ser. No. 15/509,422, filed Mar. 7, 2017, which is a National Stage application of PCT/US2015/053530, filed Oct. 1, 2015, which claims the benefit of U.S. Provisional Application No. 62/058,424, filed Oct. 1, 2014, and U.S. Provisional Application No. 62/058,153, filed Oct. 1, 2014, each of which are incorporated by reference in their entirety.

BACKGROUND

The subject matter disclosed herein relates generally to rotary wing aircraft and, more particularly, to a dual rotor, rotary wing aircraft.

Typically, aerodynamic drag associated with a rotor system of a rotary wing aircraft is a significant portion of the overall aircraft drag, commonly 25% to 30% for conventional single-rotor helicopters. The rotor system drag increases for a rotary wing aircraft having a counter-rotating coaxial system primarily due to the additional rotor hub and the interconnecting main rotor shaft assembly between the upper and lower rotor systems. For high speed rotary-wing aircrafts, the increased drag resulting from the counter-rotating coaxial rotor system may cause a relatively significant power penalty and/or limit aircraft speed.

The aerodynamic drag of the dual counter-rotating, coaxial rotor system is generated by three main components—the upper hub, the lower hub, and the interconnecting main rotor shaft assembly. The drag contributions may be approximately 40% for each of the rotor hubs, and 20% for the interconnecting shaft assembly; however, the effects are highly interactional, i.e., flow separation over one component may result in more significant flow separation and higher drag on another component.

BRIEF DESCRIPTION

In one exemplary embodiment, an aircraft includes an airframe, an extending tail, a counter rotating, coaxial main rotor assembly including an upper rotor assembly and a lower rotor assembly, and a translational thrust system positioned at the extending tail. The translational thrust system provides translational thrust to the airframe. An upper hub fairing is positioned at the upper rotor assembly. A lower hub fairing is positioned at the lower rotor assembly. A shaft fairing is disposed between the upper hub fairing and the lower hub fairing. The upper hub fairing is substantially sealed to the shaft fairing and the lower hub fairing is substantially sealed to the shaft fairing.

In addition to one or more of the features described above or below, or as an alternative, further embodiments could include wherein, the upper hub fairing is contoured to match an upper surface of the shaft fairing.

In addition to one or more of the features described above or below, or as an alternative, further embodiments could include wherein, the lower hub fairing is contoured to match a lower surface of the shaft fairing.

In addition to one or more of the features described above or below, or as an alternative, further embodiments could include wherein the shaft fairing is generally airfoil shaped.

In addition to one or more of the features described above or below, or as an alternative, further embodiments could include wherein, the shaft fairing is shaped to minimize drag.

In addition to one or more of the features described above or below, or as an alternative, further embodiments could include wherein, the upper hub fairing, lower hub fairing and shaft fairing are disposed about an axis of rotation of the main rotor assembly.

In addition to one or more of the features described above or below, or as an alternative, further embodiments could include wherein, at least 80% of the shaft fairing length is located aft of the axis of rotation of the main rotor assembly.

In addition to one or more of the features described above or below, or as an alternative, further embodiments could include wherein, at least 85% of the shaft fairing length is located aft of the axis of rotation of the main rotor assembly.

In addition to one or more of the features described above or below, or as an alternative, further embodiments could include wherein, the upper hub fairing, the shaft fairing and the lower hub fairing are coated with a conductive material.

In addition to one or more of the features described above or below, or as an alternative, further embodiments could include wherein, the main rotor assembly is a rigid rotor system.

BRIEF DESCRIPTION OF THE DRAWINGS

Referring now to the drawings wherein like elements are numbered alike in the several FIGURES:

FIG. 16C depicts a seal between the shaft fairing and an upper surface of the lower hub fairing;

DETAILED DESCRIPTION

Figure 1:
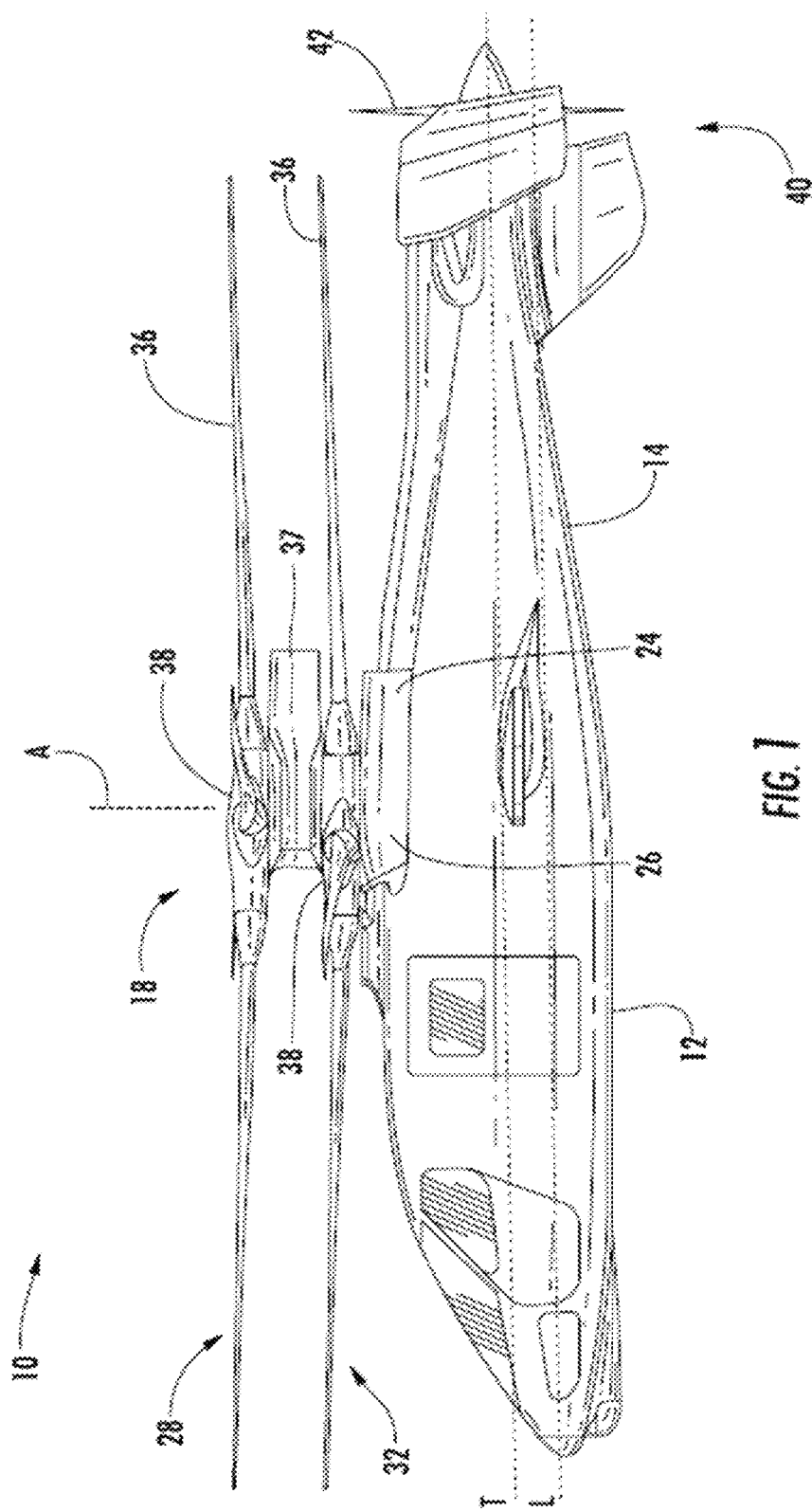
FIG. 1 depicts a rotary wing aircraft in an exemplary embodiment.

FIG. 1 depicts an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes two seats for flight crew (e.g., pilot and co-pilot) and six seats for passengers. However, an airframe 12 having another configuration is within the scope of the present disclosure. The main rotor assembly 18 is driven by a power source, for example, one or more engines 24 via a gearbox 26. The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. In some embodiments, the aircraft 10 further includes a translational thrust system 40 located at the extending tail 14 to provide translational thrust (forward or rearward) for aircraft 10.

Any number of blades 36 may be used with the rotor assembly 18. FIG. 2A depicts a planform of a rotor blade 36 in an exemplary embodiment. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments of the invention. Although, the dual rotor system is depicted as coaxial, embodiments include dual rotor aircraft having non-coaxial rotors.

The translational thrust system 40 includes a propeller 42 connected to and driven by the engine 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of propeller 42. While shown in the context of a pusher-prop configuration, it is understood that the propeller 42 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 2:
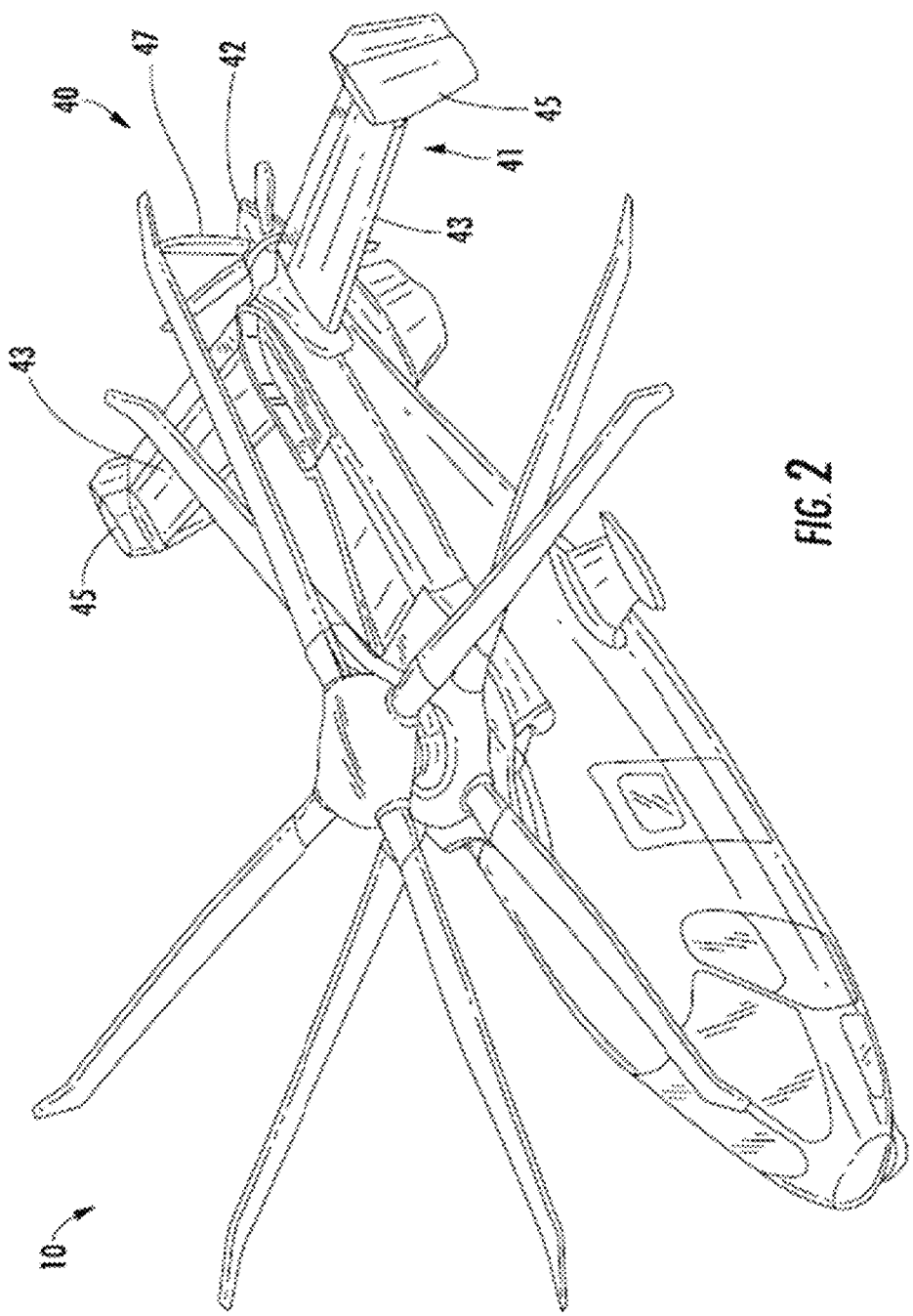
FIG. 2 is a perspective view of a rotary wing aircraft in an exemplary embodiment.
Figure 2A:
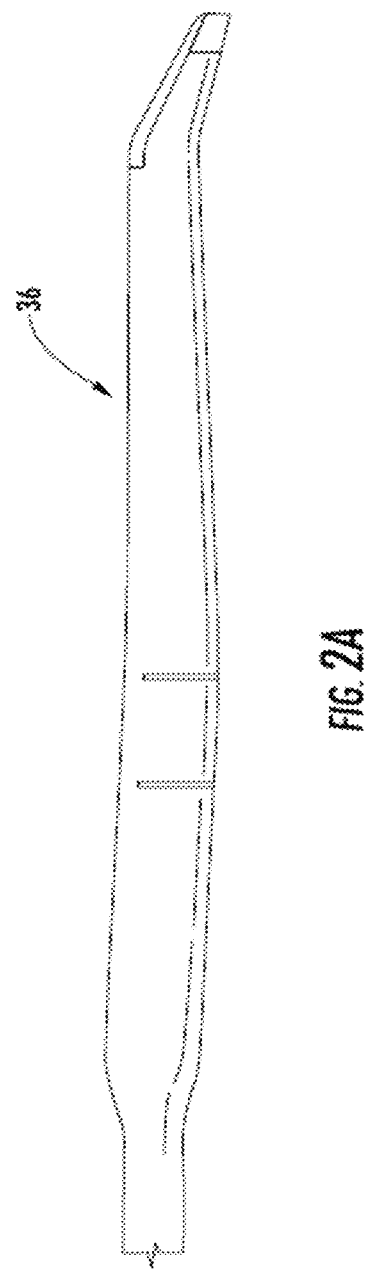
FIG. 2A depicts a planform of a rotor blade in an exemplary embodiment.

Referring to FIG. 2, translational thrust system 40 includes a propeller 42 and is positioned at a tail section 41 of the aircraft 10. Propeller 42 includes a plurality of blades 47. In exemplary embodiments, the pitch of propeller blades 47 may be altered to change the direction of thrust (e.g., forward or rearward). The tail section 41 includes active elevators 43 and active rudders 45 as controllable surfaces.

Figure 3:
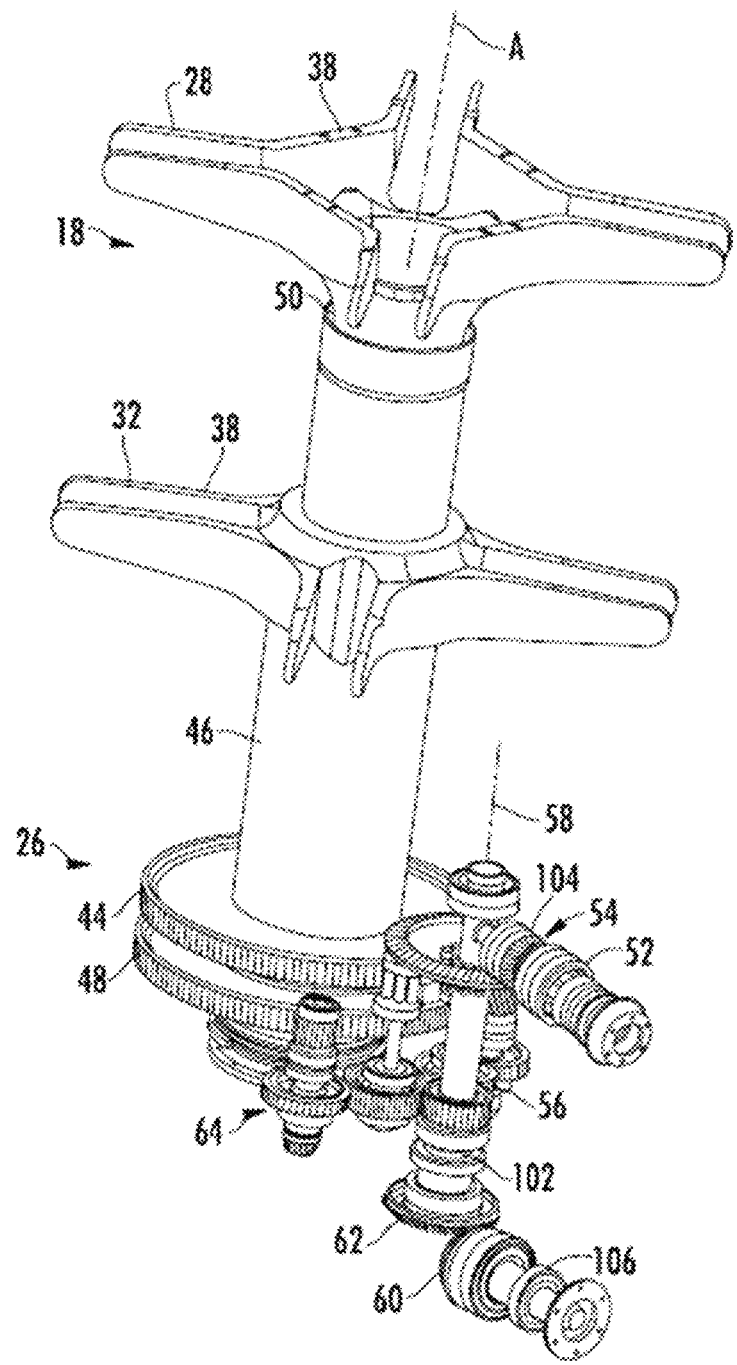
FIG. 3 is a perspective view of a gear train for a rotary wing aircraft in an exemplary embodiment.

Shown in FIG. 3 is a perspective view of portions of main rotor assembly 18 and gearbox 26. The gearbox 26 includes an upper bull gear 44, which rotates about the main rotor axis, A, and connected to the lower rotor assembly 32 via a lower rotor shaft 46 extending along the main rotor axis, A. A lower bull gear 48, which rotates about the main rotor axis, A, and is connected to the upper rotor assembly 28 via an upper rotor shaft 50 extending along the main rotor axis, A, and through an interior of the lower rotor shaft 46. Torque and rotational speed are provided to the gearbox 26 via input shaft 52 that transmits the torque and rotational speed from the engine(s) 24 to an input bevel 54 disposed at an input bevel shaft 56 of the gearbox 26 via an input bevel pinion 104. In some embodiments, the input bevel shaft 56 rotates about an input bevel shaft axis 58 parallel to the main rotor axis A. The propeller 42 is driven by a propeller output shaft 106 driven by a propeller output gear 62 disposed at a quill shaft 102, or an extension of input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. The torque split gear reduction stage 64 splits torque from the input shaft 52 and applies the divided torque to bull gears 44 and 48, respectively. While shown with the propeller output shaft 106 driven by the propeller output gear 62, it is understood that such elements could be removed where the propeller 42 is not used or is separately driven.

Figure 3A:
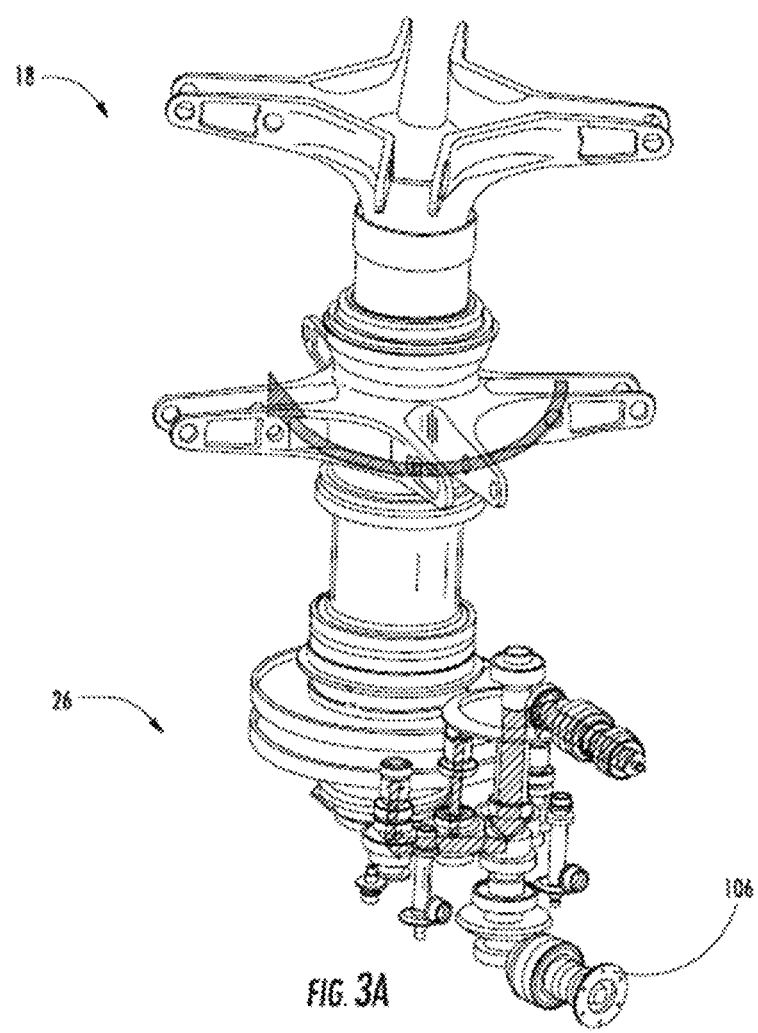
FIGS. 3A and 3B depict power distribution in the gear box in hover and cruise modes in exemplary embodiments.

FIG. 3A illustrates power distribution through gearbox 26 to main rotor assembly 18 and propeller output shaft 106 during hover mode. In hover, power flows to torque split section to drive main rotor assembly 18. The propeller output shaft 106 spins at all times to drive features on propeller box while propeller 42 is unclutched. During hover mode, the majority of power flows to the main rotor assembly 18.

Figure 3B:
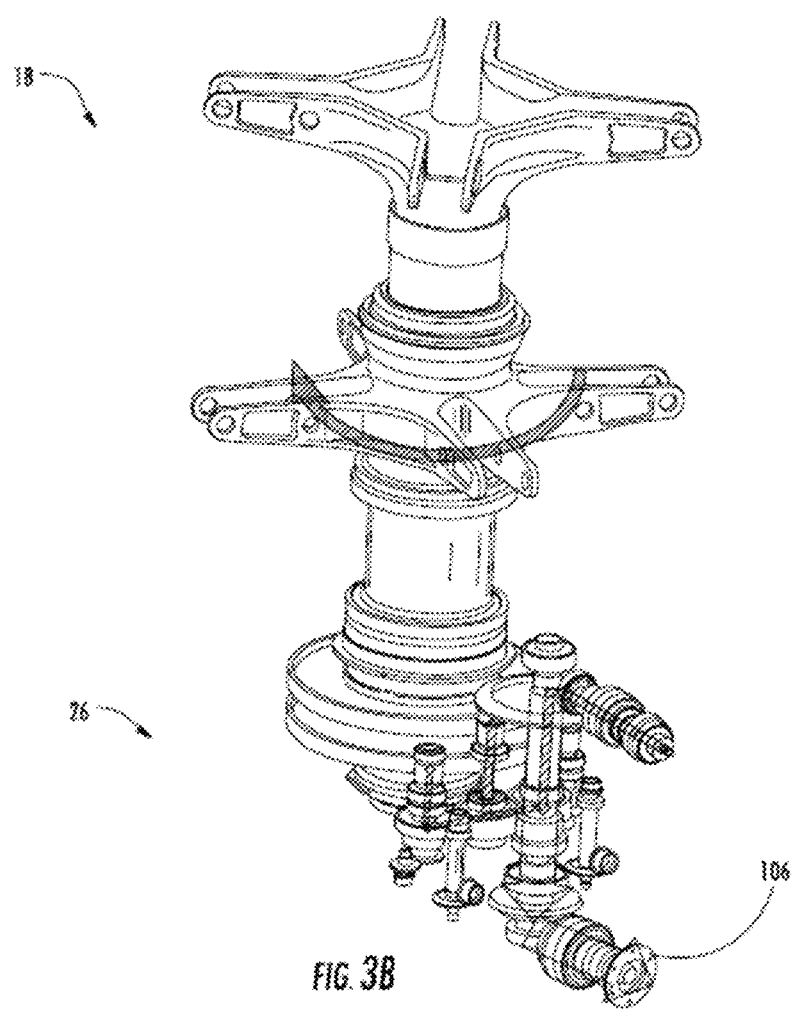

FIG. 3B illustrates power distribution through gearbox 26 to main rotor assembly 18 and propeller output shaft 106 during cruise mode. In high speed cruise, the majority of power flows to the propeller output shaft 106 while the main rotor assembly 18 is operating near an autorotative state.

Figure 4:
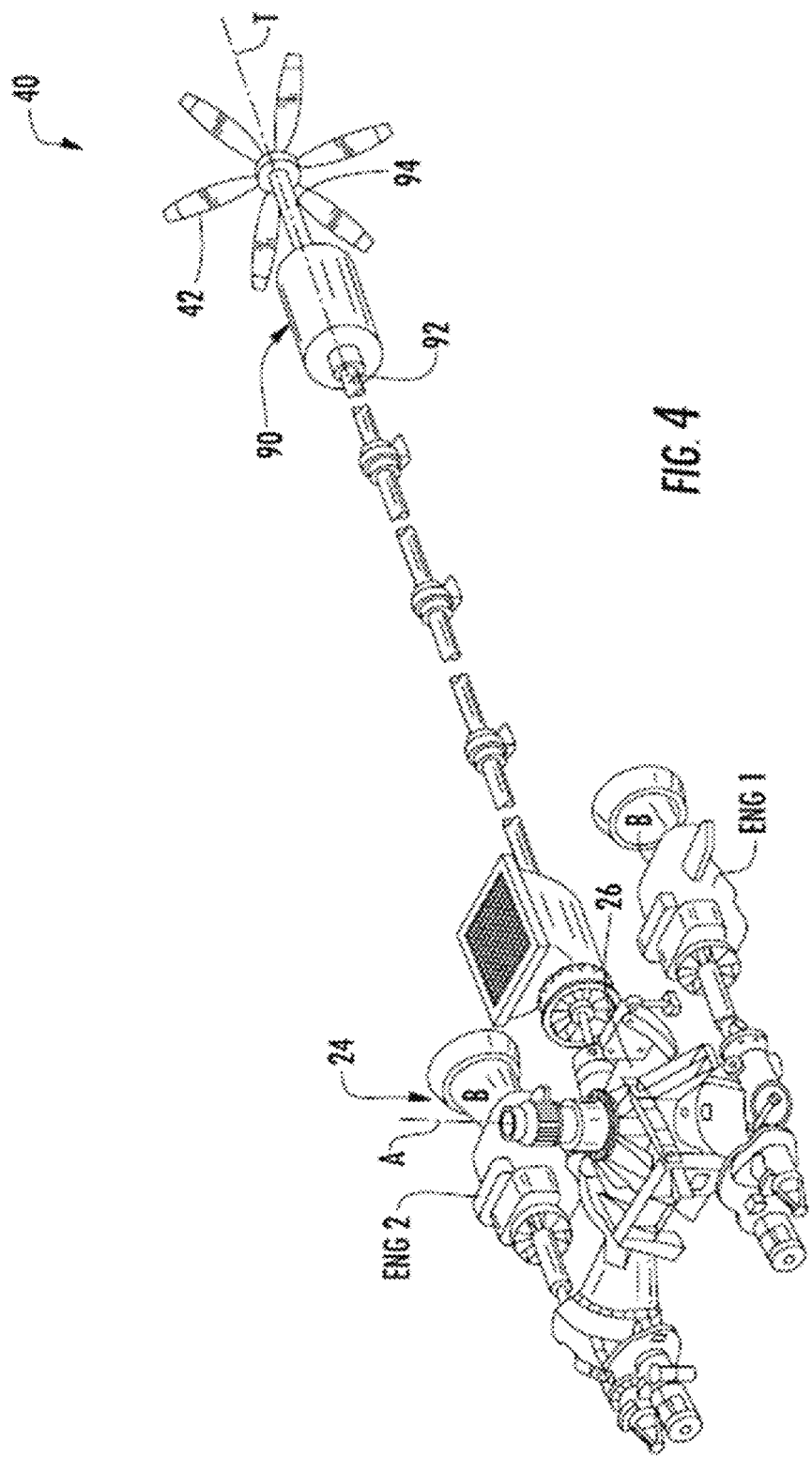
FIG. 4 is a perspective view of a gearbox and translational thrust system in an exemplary embodiment.

Referring to FIG. 4, the main rotor assembly 18 is driven about the axis of rotation, A, through a main gearbox (MGB) 26 by a multi-engine powerplant system 24, having two engine packages ENG1, ENG2 in the example in FIG. 4. Although FIG. 4 depicts two engines 24, it is understood that aircraft 10 may use a single engine 24, or any number of engines. The multi-engine powerplant system 24 generates power available for flight operations and couples such power to the main rotor assembly 18 and the translational thrust system 40 through the MGB 26. The MGB 26 may be interposed between the powerplant system 24, the main rotor assembly 18 and the translational thrust system 40.

A portion of the drive system, such as downstream of the MGB 26 for example, includes a gearbox 90 (also referred to as a clutch). The combined gearbox 90 selectively operates as a clutch and a brake for operation of the translational thrust system 40 with the MGB 26. The gearbox 90 also operates to provide a rotor brake function for the main rotor assembly 18.

The combined gearbox 90 generally includes an input 92 and an output 94 generally defined along an axis parallel to rotational axis, T. The input 92 is generally upstream of the combined gearbox 90 relative the MGB 26 and the output 94 is downstream of the combined gearbox 90 and upstream of the pusher propeller system 40 (FIG. 2). The combined gearbox 90 may be categorized by the technique used to disengage-engage (e.g., clutch) or stop (e.g., brake) the load such as friction, electromagnetic, mechanical lockup, etc., and by the method used to actuate such as mechanical, electric, pneumatic, hydraulic, self-activating, etc. It should be understood that various combined gearbox 90 systems may be utilized to include but not to be limited to mechanical, electrically, hydraulic and various combinations thereof.

Figure 5:
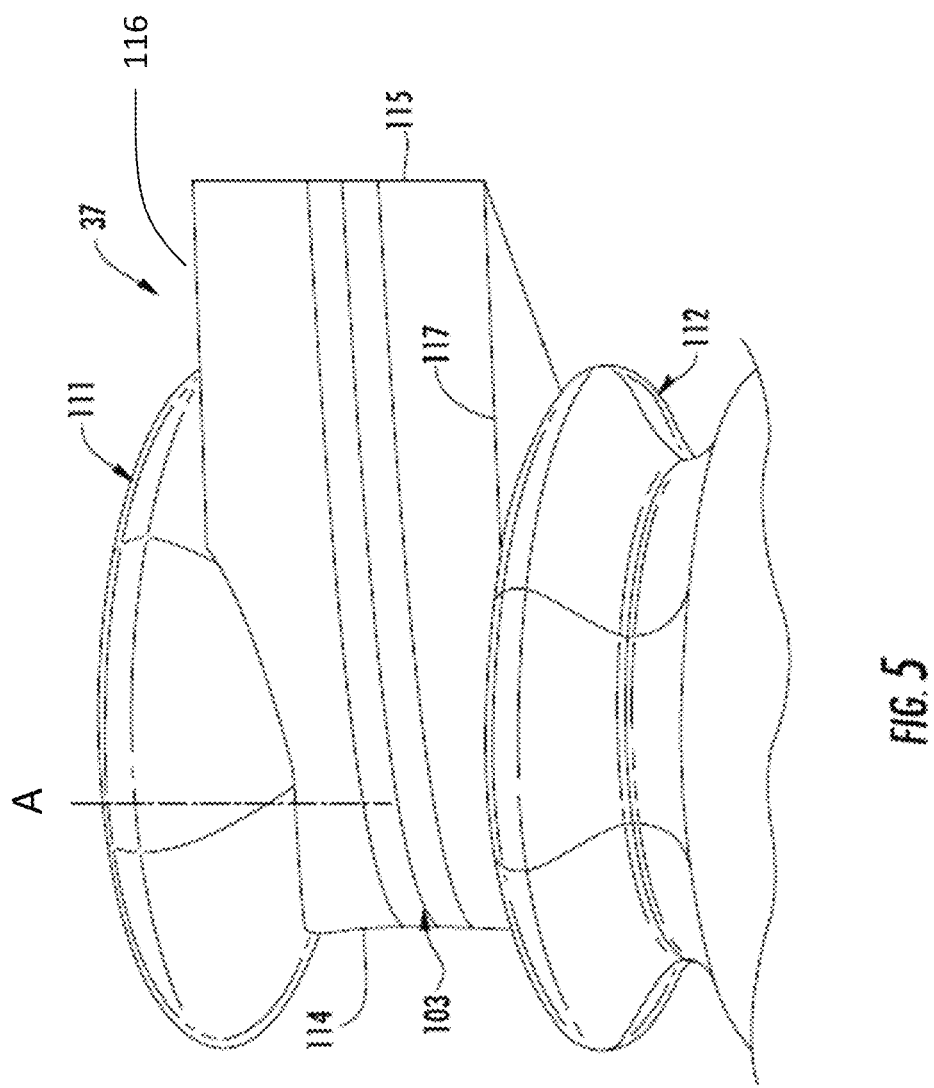
FIG. 5 is a perspective view of a rotor hub fairing in an exemplary embodiment.

Referring to FIG. 5, an exemplary rotor hub fairing 37 is shown. As shown in FIG. 1, the rotor hub fairing 37 is generally located between and around the upper and lower rotor assemblies such that the rotor hubs 38 are at least partially contained therein. The rotor hub fairing 37 provides drag reduction. Rotor hub fairing 37 is illustrated having generally elliptical, in cross-section, upper and lower hub fairings 111 and 112, and an airfoil-type shaped (in horizontal cross-section) shaft fairing 103. The upper hub fairing 111, lower hub fairing 112 and shaft fairing 103 are disposed about an axis of rotation, A, of the main rotor assembly. The airfoil shape of the shaft fairing 103 includes a leading edge 114, and a trailing edge 115 aft of the upper and lower fairings 111, 112. The airfoil shape of the shaft fairing 103 additionally includes a chord that connects the leading and trailing edges 114, 115 of the airfoil. In one embodiment, the airfoil shape, including the upper surface 116 and the lower surface 117, is symmetrical about a plane extending along the length of the shaft fairing 103 and containing the axis of rotation, A. The shaft fairing 103 may be shaped to minimize drag. As noted above, the upper and lower rotor hubs 38 may be positioned, at least partially, in the upper and lower hub fairings 111, 112.

The rotor hub fairing 37 is a substantially sealed fairing, meaning there are few or no passages for air to travel through the interior of the rotor hub fairing 37. The upper hub fairing 111 is substantially sealed to the shaft fairing 103 and the lower hub fairing 112 is substantially sealed to the shaft fairing 103. The sealed rotor hub fairing 37 substantially eliminates air pathways through the rotor hub structure, and eliminates drag associated with such air paths.

The upper hub fairing 111 has a lower surface that is contoured to match an upper surface of the shaft fairing 103. Similarly, the lower hub fairing 112 has an upper surface that is contoured to match a lower surface of the shaft fairing 103. In one embodiment, at least 80% of the shaft fairing longitudinal length is located aft of the axis of rotation, A, of the main rotor assembly. In another embodiment, at least 85% of the shaft fairing longitudinal length is located aft of the axis of rotation, A, of the main rotor assembly. In exemplary embodiments, the upper hub fairing, the shaft fairing and the lower hub fairing are coated with a conductive material to conduct lightning strikes to the airframe 14 of aircraft 10.

Figure 12:
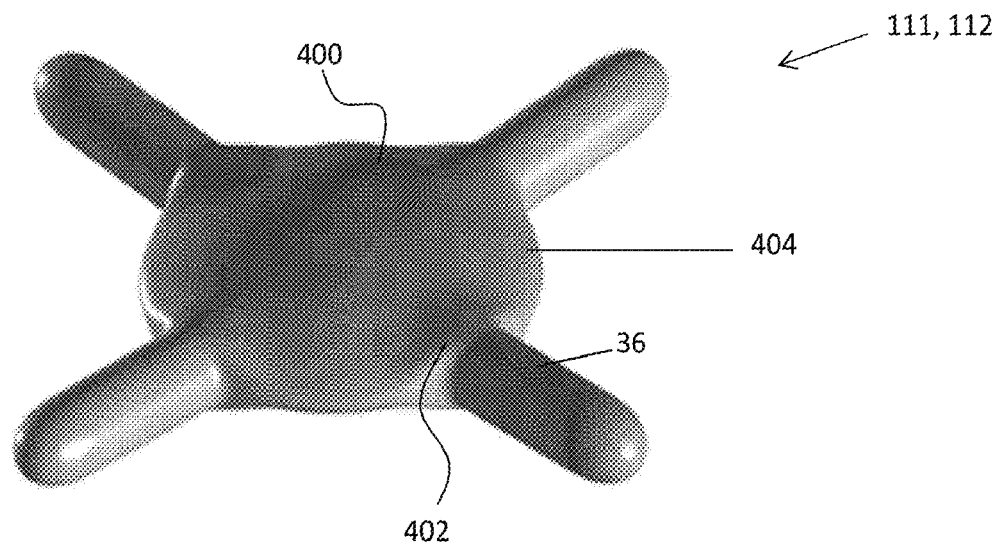
FIG. 12 is a perspective view of an upper or lower rotor hub fairing according to an embodiment.
Figure 13:
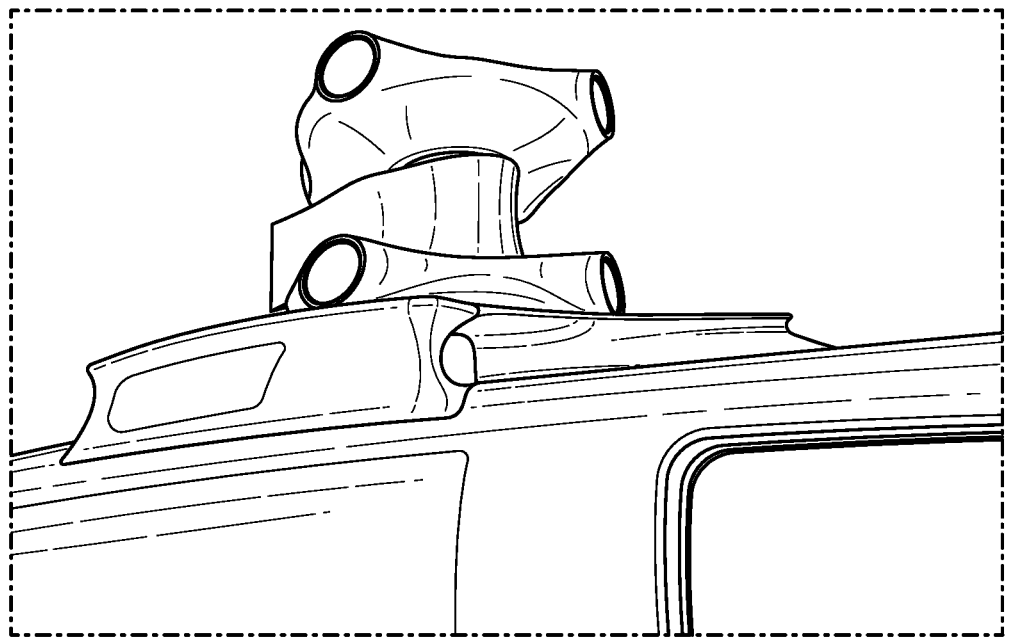
FIG. 13 is a perspective view of an upper or lower hub fairing according to an embodiment.

Referring now to FIGS. 12-15, the upper and lower hub fairings 111, 112 are illustrated in more detail. Each rotor hub fairing 111, 112 includes a hub body 400 having a plurality of shank extension regions 402 configured to receive a portion of a rotor blade 36. As shown in FIG. 12, the geometry of at least one of the upper and lower hub fairings 111, 112 is modified relative to conventional hub fairings (see FIG. 13). Moving radially inward from the outboard portion of the hub shank regions 402 towards a center of the hub body 400, a filleting process applied progressively blends the geometry from a circle to elliptical shape. As a result of this geometrical blending, the surface of the hub fairings 111, 112 is circumferentially smoother and the sections 404 between the shank extension regions 402 are locally thinner, while retaining the necessary thickness in the shank extension regions 402.

Figure 15:
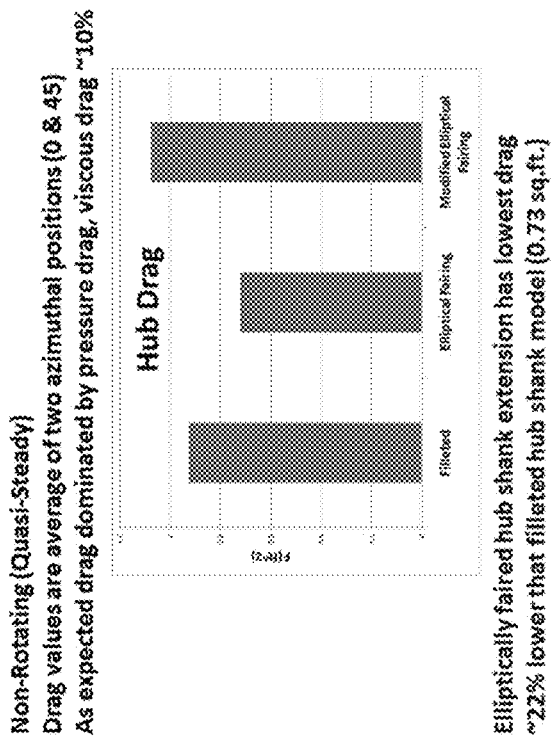
FIG. 15 is graph illustrated the drag of the comparing various rotor hub fairings of FIG. 14 according to an embodiment.
Figure 14:
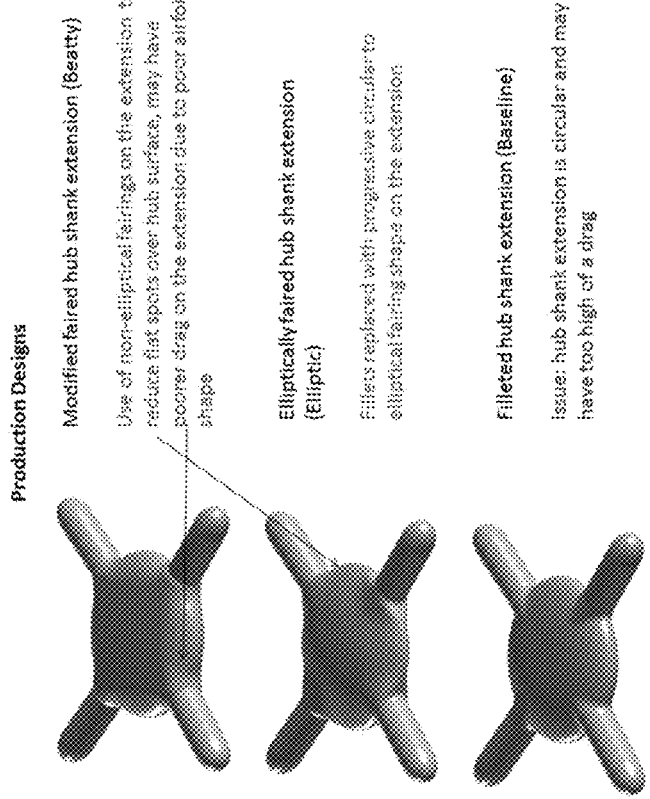
FIG. 14 is a perspective view comparing various the upper or lower hub fairings according to an embodiment.

A comparison of various shaped hub fairings, including a conventional hub fairing and the hub fairing having the blended circular and elliptical geometry as described herein are illustrated in FIGS. 14 and 15. This blended circular and elliptical shape reduces not only the drag on the hub body, but also the interference drag associated with the shank hub interface.

Figure 16A:
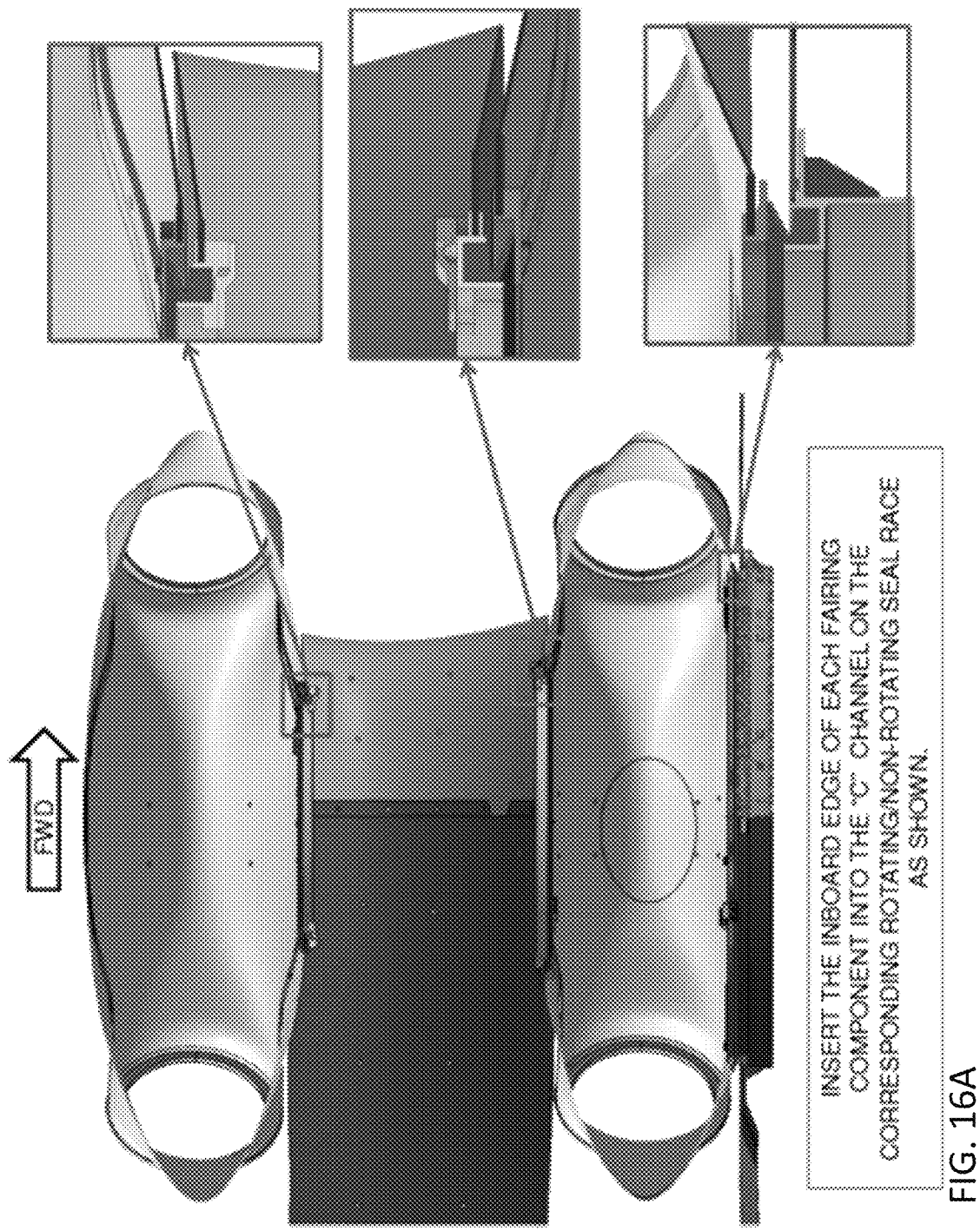
FIG. 16A depicts the upper hub fairing is substantially sealed to the shaft fairing and the lower hub fairing is substantially sealed to the shaft fairing.
Figure 16B:
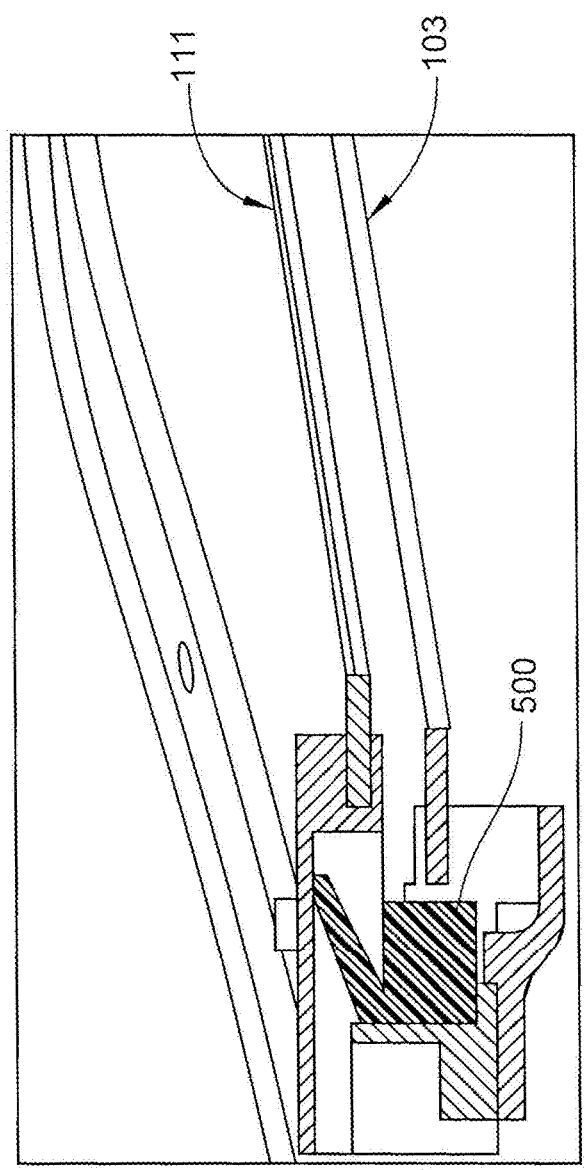
FIG. 16B depicts a seal between shaft fairing and the upper hub fairing.
Figure 16D:
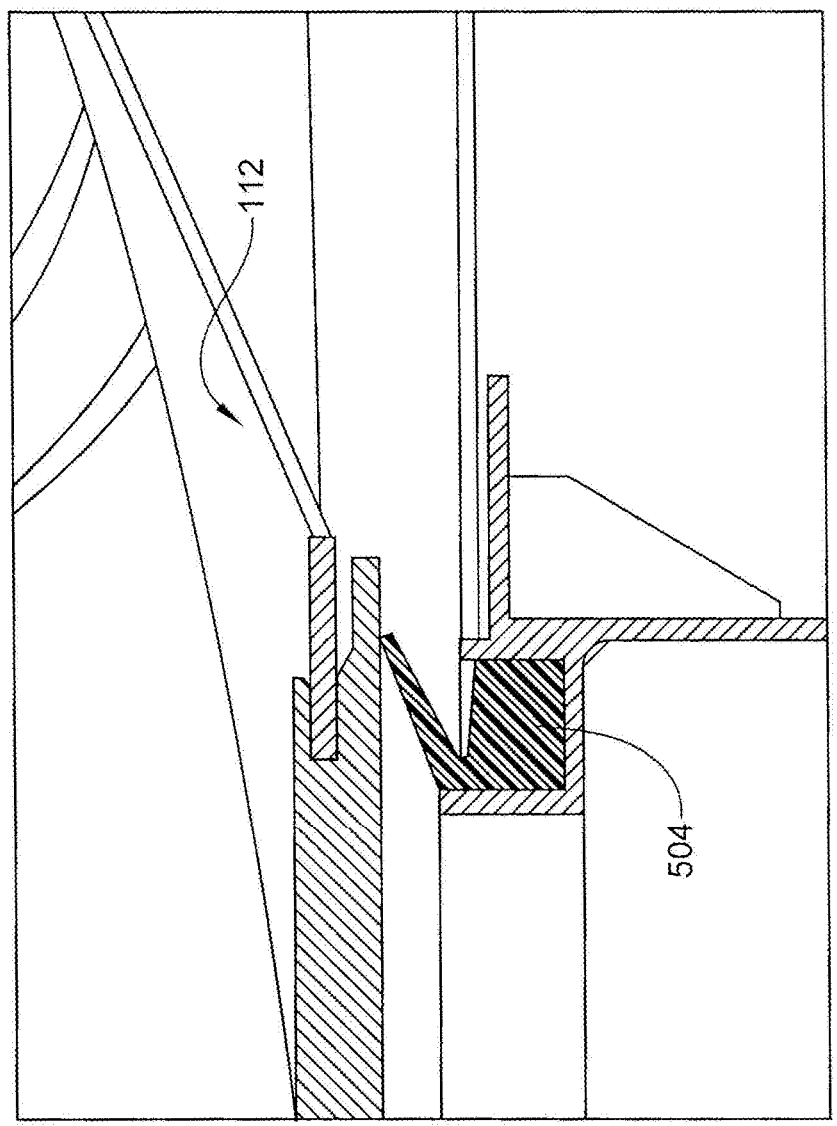
FIG. 16D depicts a seal between the shaft fairing and a lower surface of the lower hub fairing.
Figure 17:
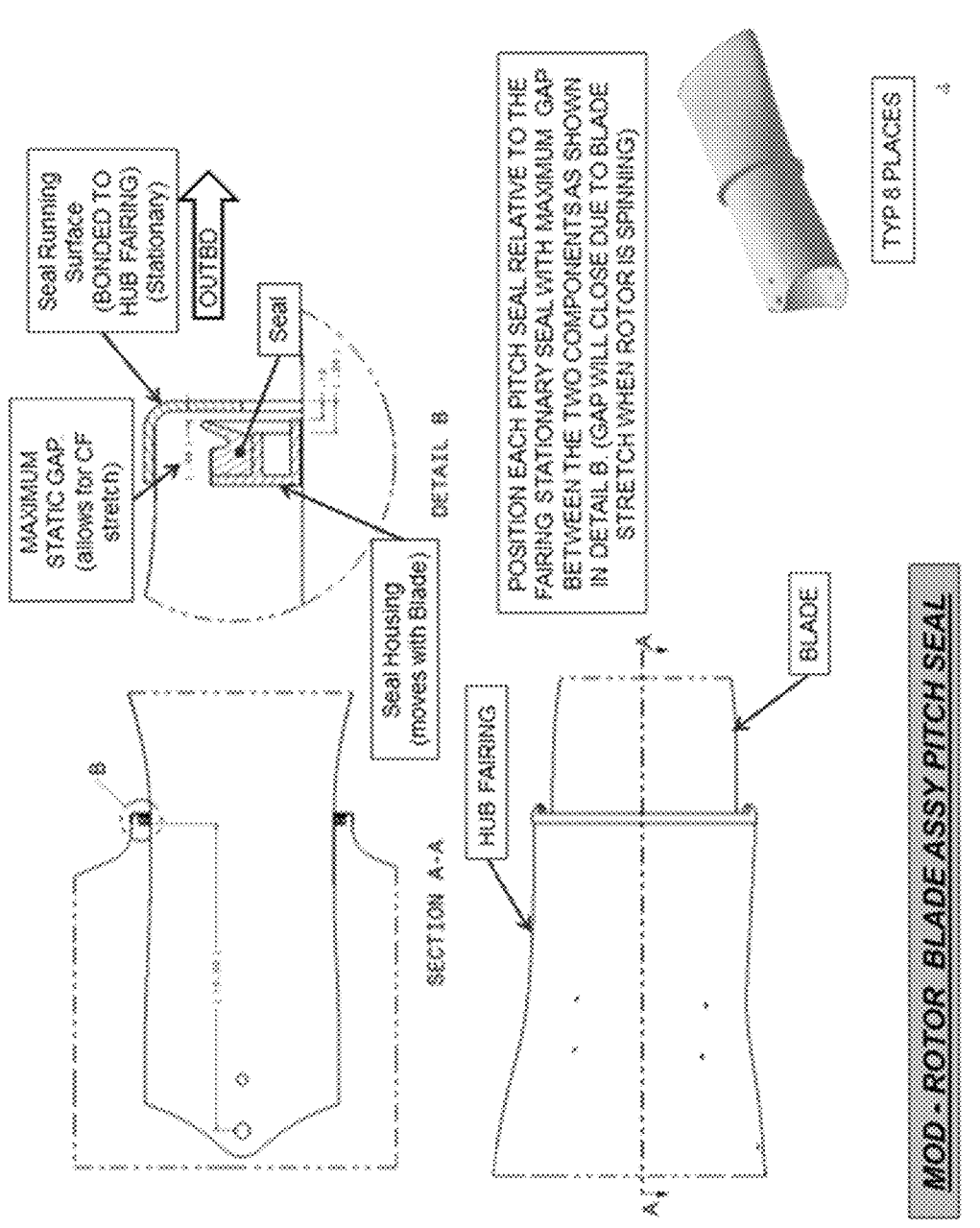
FIG. 17 is a schematic diagram of an interface between the upper or lower hub fairings and a rotor blade according to an embodiment.

Seals are provided to improve the aerodynamics of the rotor fairing 37. In one embodiment, illustrated in FIG. 16, each of the upper and lower hub fairings 111, 112 and the sail fairing 103 are configured to connect to one another via insertion into a c-channel forming a corresponding rotating or non-rotating seal race. Referring now to FIG. 17, to seal the interface between each rotor blade 36 and the hub shank regions 402, a vertical face seal or gasket may be positioned about the outer mold line of the blades 36. A running surface of the seal is used to seal the hub shank region 402 of the hub fairing around the blade spanwise axis. In one embodiment, the seal is supported by the hub fairing, such as within a channel formed in the hub shank region 402. Because fasteners are not required, the outer mold line of the rotor blade 36 remains clean and unaffected. The vertical face seal is positioned such that a gap at rest is closed when the rotors 28, 32 are rotating about axis A. This constant running gap allows for easier installation and maintenance when installing and removing the hub fairings 111, 112. Inclusion of the seals described herein prevents air from entering into the interior of the hub fairings 111, 112. As a result, generation of a constant running gap and complete sealing of the hub fairing system occurs.

Another feature to reduce drag on the rotor hub is positioning control rods, such as push rods for rotor control, internal to the main rotor shaft. Referring to FIG. 3, pushrods for swashplates in the upper rotor assembly 28 and lower rotor assembly 32 are located internal to the lower rotor shaft 46 and upper rotor shaft 50. This prevents the pushrods from being exposed and increasing drag on the rotor hub. The use of a rigid rotor system aids in sealing the rotor hub fairing 37.

Figure 6:
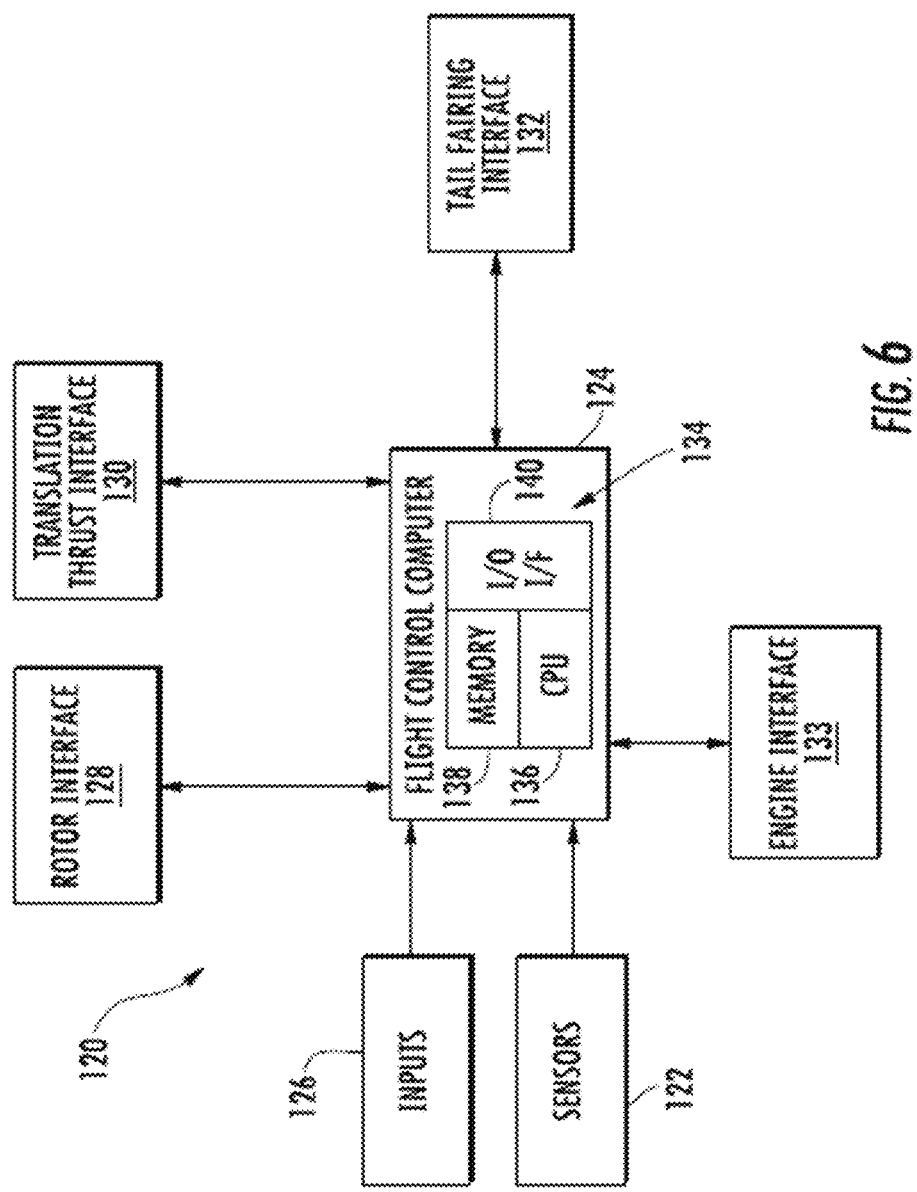
FIG. 6 depicts a flight control system in an exemplary embodiment.

Portions of the aircraft 10 are controlled by a flight control system 120 illustrated in FIG. 6. In one embodiment, the flight control system 120 is a fly-by-wire (FBW) control system. In a FBW control system there is no direct mechanical coupling between a pilot's controls and movable components of aircraft 10. Instead of using mechanical linkages, a FBW control system includes a plurality of sensors 122 which can sense the position of controlled elements and generate electrical signals proportional to the sensed position. The sensors 122 may also be used directly and indirectly to provide a variety of aircraft state data to a flight control computer (FCC) 124. The FCC 124 may also receive inputs 126 as control commands from various sources. For instance, the inputs 126 can be pilot inputs, auto-pilot inputs, navigation system based inputs, or any control inputs from one or more control loops executed by the FCC 124 or other subsystems. In response to inputs from the sensors 122 and inputs 126, the FCC 124 transmits signals to various subsystems of the aircraft 10.

Flight control system 120 may include a rotor interface 128 configured to receive commands from the FCC 124 and control one or more actuators, such as a mechanical-hydraulic or electric actuators, for the upper rotor assembly 28 and lower rotor assembly 32. In an embodiment, inputs 126 including cyclic, collective, pitch rate, and throttle commands that may result in the rotor interface 128 driving the one or more actuators to adjust upper and lower swashplate assemblies (not depicted) for pitch control of the upper rotor assembly 28 and lower rotor assembly 32. Alternatively, pitch control can be performed without a swashplate assemblies using individual blade control (IBC) in the upper rotor assembly 28 and lower rotor assembly 32. The rotor interface 128 can manipulate the upper rotor assembly 28 and lower rotor assembly 32 independently. This allows different collective and cyclic commands to be provided to the upper rotor assembly 28 and lower rotor assembly 32.

Flight control system 120 may include a translational thrust interface 130 configured to receive commands from the FCC 124 to control one or more actuators, such as a mechanical-hydraulic or electric actuators, for the control of the translational thrust system 40. In an embodiment, inputs 126 may result in the translational thrust interface 130 controlling speed of propeller 42, altering the pitch of propeller blades 47 (e.g., forward or rearward thrust), altering the direction of rotation of propeller 42, controlling gearbox 90 to employ a clutch 91 to engage or disengage the propeller 42, etc.

Flight control system 120 may include a tail fairing interface 132. The tail fairing interface 132 is configured to receive commands from the FCC 124 to control one or more actuators, such as a mechanical-hydraulic or electric actuators, for the active elevator 43 and/or active rudders 45 of FIG. 2. In an embodiment, inputs 126 include an elevator pitch rate command for the tail fairing interface 132 to drive the one or more actuators for pitch control of the active elevators 43 of FIG. 2. In an embodiment, inputs 126 include a rudder command for the tail fairing interface 132 to drive the one or more actuators for positional control of the active rudders 45 of FIG. 2.

Flight control system 120 may include an engine interface 133. The engine interface 133 is configured to receive commands from the FCC 124 to control engine(s) 24. In an embodiment, inputs 126 include a throttle command from the pilot to adjust the RPM of engine(s) 24. FCC 124 may also send commands to engine interface 133 to control the engine(s) in certain predefined operating modes (e.g., quiet mode).

The FCC 124 includes a processing system 134 that applies models and control laws to augment commands based on aircraft state data. The processing system 134 includes processing circuitry 136, memory 138, and an input/output (I/O) interface 140. The processing circuitry 136 may be any type or combination of computer processors, such as a microprocessor, microcontroller, digital signal processor, application specific integrated circuit, programmable logic device, and/or field programmable gate array, and is generally referred to as central processing unit (CPU) 136. The memory 138 can include volatile and non-volatile memory, such as random access memory (RAM), read only memory (ROM), or other electronic, optical, magnetic, or any other computer readable storage medium onto which data and control logic as described herein are stored. Therefore, the memory 138 is a tangible storage medium where instructions executable by the processing circuitry 136 are embodied in a non-transitory form. The I/O interface 140 can include a variety of input interfaces, output interfaces, communication interfaces and support circuitry to acquire data from the sensors 122, inputs 126, and other sources (not depicted) and communicate with the rotor interface 128, the translation thrust interface 130, tail fairing interface 132, engine interface 133, and other subsystems (not depicted).

In exemplary embodiments, the rotor interface 128, under control of the FCC 124, can control the upper rotor assembly 28 and lower rotor assembly 32 to pitch in different magnitudes and/or different directions at the same time. This includes differential collective, where the upper rotor assembly 28 has a collective pitch different than the collective pitch of the lower rotor assembly 32, in magnitude and/or direction. Differential pitch control also includes differential cyclic pitch control, where the upper rotor assembly 28 has a cyclic pitch different than the cyclic pitch of the lower rotor assembly 32, in magnitude, axis of orientation (e.g., longitudinal or lateral) and/or direction. The differential collective and the differential cyclic pitch control may be accomplished using independently controlled swashplates in the upper rotor assembly 28 and lower rotor assembly 32. Alternatively, differential collective and the differential cyclic pitch control may be accomplished using individual blade control in the upper rotor assembly 28 and lower rotor assembly 32.

The ability to independently control the pitch of the upper rotor assembly 28 and lower rotor assembly 32 allows the lower rotor assembly 32 to be adjusted due to its position beneath the upper rotor assembly 28. The lower rotor assembly 32 is located in the downwash of the upper rotor assembly 28. To accommodate for this, the lower rotor assembly 32 may have a collective pitch that differs from the collective pitch of the upper rotor assembly 28.

In the case of traditional helicopters, as the forward velocity of the aircraft increases, the velocity of the retreating blade relative to the airflow decreases. This causes a stall region to arise at the root of the retreating blade and expand towards to distal end of the blade as speed increases. As this stall region increases, the overall lift vector of the aircraft shifts from the center of the aircraft towards the advancing blade which is providing the majority of lift for the aircraft. This imbalance of lift creates an unstable rolling moment on the aircraft which is stabilized by a combination of reducing forward flight and blade flapping, which reduces overall aircraft lift. With a dual rotor aircraft, such as aircraft 10, the counter rotating rotor heads balance out the torque generated by each rotor head and also balances the lift generated by each advancing blade without the need for blade flapping or reducing the speed of the aircraft, or the need for a wing. This is made possible by the rigid rotor system. Rigid rotors allow for a reduced spacing between rotors. With two rigid rotors, the roll moments cancel at the main rotor shaft. Other rotor systems can generate opposing head moments, however, a greater spacing is required between rotors of those systems.

The use of upper rotor assembly 28 and lower rotor assembly 32 allows the pre-cone angle to be set on each individual rotor to reduce bending stress on the blades. In a hinged rotor design, the hinges will naturally go to an angle to reduce bending stress. On a rigid rotor aircraft, such as aircraft 10, there is no hinge, so the pre-cone angle is set to avoid the extra stress attributed to the bending moment. A useful pre-cone angle is one where the centrifugal force of the blade pulling out matches the lift of the blade up. Due to the independent nature of the upper rotor assembly 28 and lower rotor assembly 32, differential pre-cone is used in aircraft 10. Differential pre-cone refers to the fact that the upper rotor assembly 28 and lower rotor assembly 32 have different pre-cone angles. The different pre-cone angles for the upper rotor assembly 28 and lower rotor assembly 32 help maintain tip clearance. In an exemplary embodiment, the pre-angle on the upper rotor assembly 28 is about 3 degrees and the pre-cone angle on the lower rotor assembly 32 is about 2 degrees.

Aircraft 10 is operational in a variety of modes, including take-off, cruise, landing, etc. Cruise mode refers to generally horizontal flight. During cruise, aircraft 10 can reach speeds of above about 200 knots, with speed reaching up to about 250 knots. During cruise mode, the main rotor assembly 18 provides the majority of lift for the aircraft. In exemplary embodiments and flight modes, the main rotor assembly 18 provides greater than about 85% of the lift during cruise mode.

Aircraft 10 may assume various acoustic modes, depending on the flight state. FCC 124 may control RPM of engines 24, RPM of propeller 42, and gearbox 90 to engage or disengage the propeller 42 to assume different noise levels. For example, at take-off noise may not be a concern, and there would be no changes in aircraft operation to adjust the noise level. However, during engine start-up, the gearbox 90 may be disengaged such that the propeller 42 is decoupled from the main rotor system 18 to improve ground safety. As the aircraft approaches a target, it may be desirable to disengage the propeller 42 from the main rotor assembly 18 using gearbox 90 and/or reduce RPM of engines 24 to reduce the noise produced by aircraft 10. The propeller 42 may be disengaged at various other flight states (e.g., low speed cruise) to reduce noise. The RPM of the main rotor assembly 18 and RPM of propeller 42 may be independently controlled (e.g., through gearbox 90 or FCC 124). This allows a variety of flight states to be achieved.

The pilot may enter separate commands to reduce aircraft noise, for example, disengaging the propeller 42, reducing engine RPM, and increasing collective pitch as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42, reduces the engine 24 RPM and/or increases collective pitch without further demand on the pilot.

The use of the translational thrust system 40 allows the aircraft 10 to move forward or rearward (depending on the pitch of the propeller blades) independent of the pitch attitude of the aircraft. Cyclic is used to adjust the pitch attitude (nose up, nose down or level) of the aircraft while the translational thrust system 40 provides forward and rearward thrust.

The motor rotor assembly 18 system and the translational thrust system 40 are connected through the main gearbox 26. A gear ratio of main gearbox 26 is selected so as to keep propeller 42 at a high efficiency and suitable noise level during cruise mode. The gear ratio of main gearbox 26 dictates the ratio of the rotor speed of main rotor assembly 18 to propeller speed of propeller 42.

Figure 11:
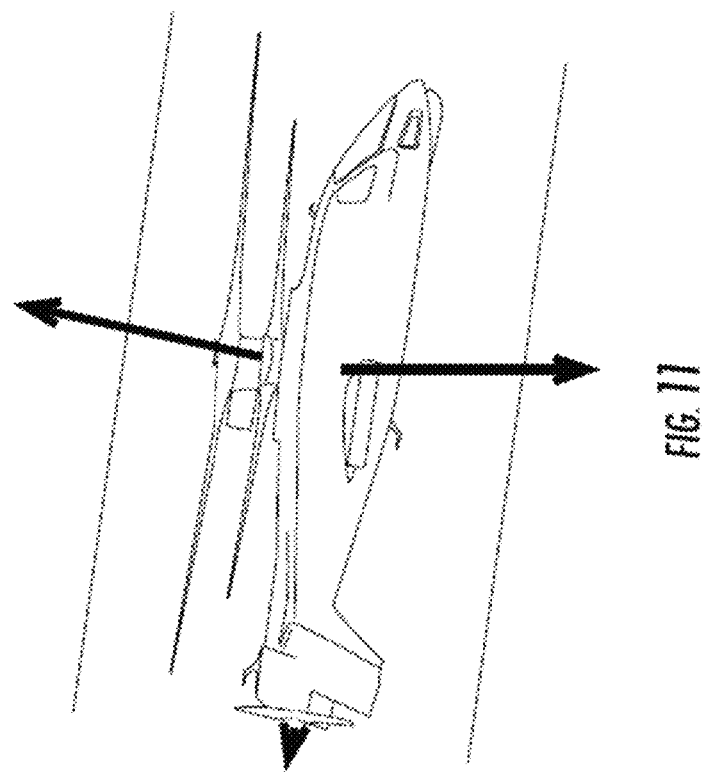
FIGS. 10 and 11 illustrate force vectors in exemplary hover states.
Figure 10:
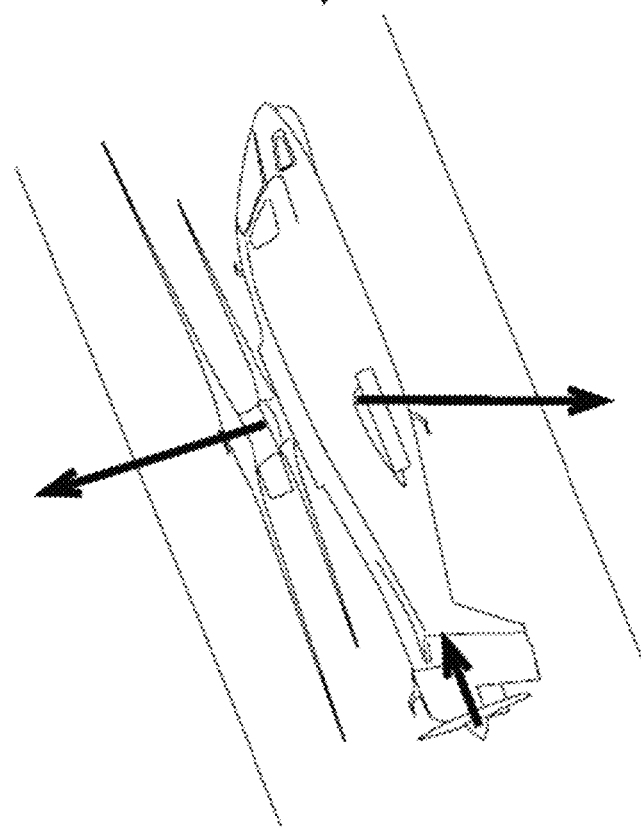

Embodiments of aircraft 10 provide the pilot with increased situational awareness by allowing the aircraft attitude (e.g., the angle of longitudinal axis, L, relative to horizontal) to be adjusted by cyclic pitch of the main rotor assembly 18 and the forward and rearward thrust to be controlled by the translational thrust system 40. This allows a variety of flight modes to be achieved, which allows the pilot to be more aware of their surroundings. Aircraft 10 can take off at a horizontal attitude (e.g., axis L is horizontal), which also may be referred to as vertical take-off. Aircraft 10 may also fly forward or cruise with the nose angled upwards, nose angled downwards or level. Aircraft 10 can hover with the nose angled upwards or downwards or level. FIGS. 10 and 11 illustrate force vectors from the main rotor assembly and propeller for hover nose up and hover nose down, respectively. Aircraft 10 can also land substantially parallel to a non-horizontal or sloped surface by adjusting the attitude of the aircraft using cyclic of the main rotor assembly 18. The use of main rotor assembly 18 for aircraft attitude and the translational thrust system 40 for thrust allows aircraft 10 to assume a variety of trim states.

Embodiments provide independent control of the active elevators 43 and/or active rudders 45 as controllable surfaces in the tail section 41. The elevator surfaces 43 may be controlled independently by the FCC 124 through the tail fairing interface 132. The rudder surfaces 45 may be controlled independently by the FCC 124 through the tail fairing interface 132.

The configuration of aircraft 10 and the controlled afforded by FCC 124 allows aircraft 10 to provide a high bank angle capability at high speeds. For example, in an exemplary embodiment, aircraft 10 can achieve a bank angle of about 60 degrees at about 210 knots.

Aircraft 10 may make use of longitudinal lift offset in trim to compensate for rotor-on-rotor aerodynamic interaction between the upper rotor assembly 28 and lower rotor assembly 32. Aircraft 10 may adjust differential longitudinal cyclic as a function of operational states of the aircraft (e.g., take-off, cruise, land, etc.). Differential longitudinal cyclic refers to upper rotor assembly 28 and lower rotor assembly 32 having different cyclic pitch along the longitudinal axis of the aircraft. Differential longitudinal cyclic may also be used to generate yaw moments. Lift offset may be used to control aircraft, where lateral lift offset adjusts roll and longitudinal lift offset adjusts pitch.

FCC 124 may control RPM of engine(s) 24, RPM of propeller 42, and gearbox 90 to engage or disengage the propeller 42 to assume different noise levels. For example, at take-off noise may not be a concern, and there would be no changes in aircraft operation to adjust the noise level. As the aircraft approaches a target, it may be desirable to disengage the propeller 42 using gearbox 90 and/or reduce RPM of engines 24 to reduce the noise produced by aircraft 10. The propeller 42 may be disengaged at various other flight states (e.g., high speed) to reduce noise. The RPM of the main rotor assembly 18 and RPM of propeller 42 may be independently controlled (e.g., through gearbox 90).

The pilot may enter separate commands to reduce aircraft noise, for example, disengaging the propeller 42 and reducing engine RPM as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42 and/or reduces the engine 24 RPM without further demand on the pilot.

Figure 7:
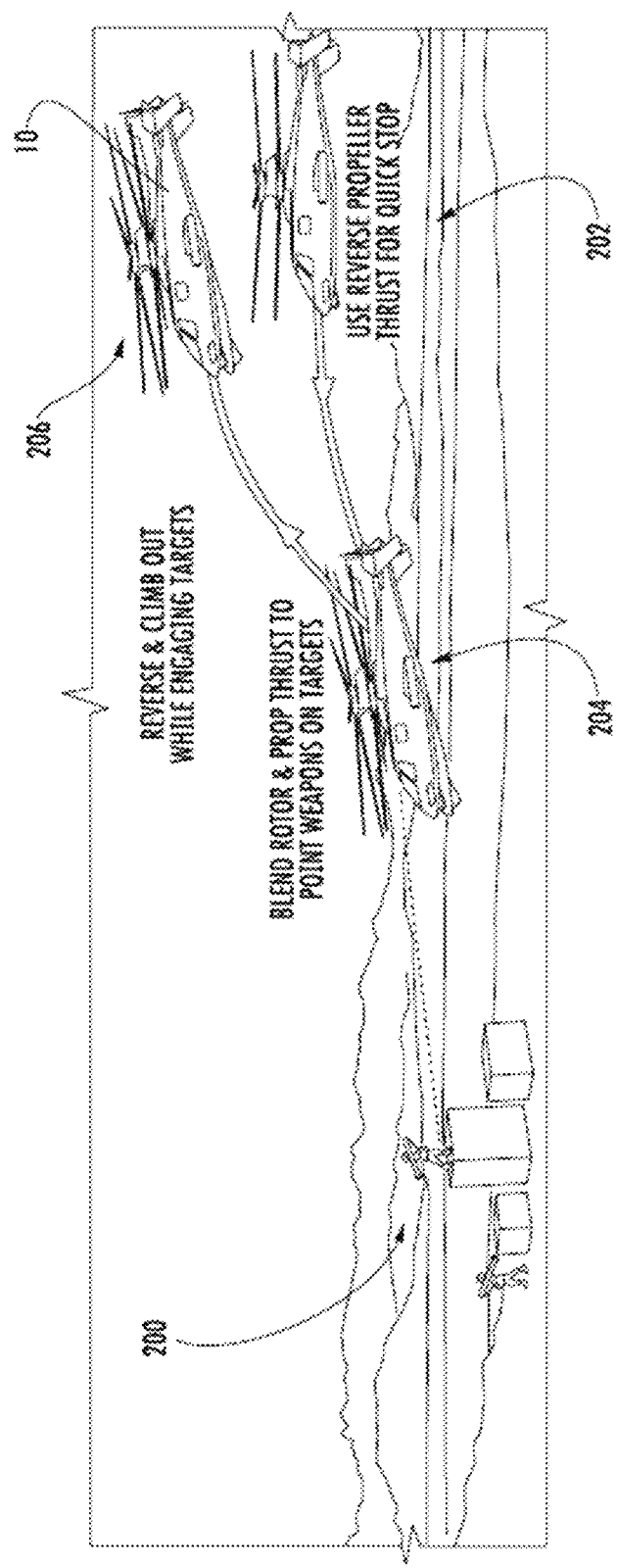
FIG. 7 depicts a flight maneuver in an exemplary embodiment.

Aircraft 10 provides the ability to approach a target and reverse thrust while maintaining an attitude directed at the target. FIG. 7 depicts aircraft 10 approaching a target 200. In a first state, 202, the aircraft 10 alters the pitch of blades 47 in propeller 42 to provide reverse thrust to bring the aircraft to a quick stop. At state 204, the main rotor assembly 18 and propeller 42 are controlled to pitch aircraft 10 towards target 200. At state 206, the propeller 42 is used to provide reverse thrust to move away from target 200 and climb, while still maintaining an attitude with the nose of aircraft 10 facing target 200.

The use of a dual rotor system and translational thrust allows aircraft 10 to eliminate the need for a variable angle between the main axis of rotation of the rotor system (e.g., axis A in FIG. 1) and aircraft longitudinal axis L. In conventional helicopters, the angle between the main axis of rotation of the rotor system and the aircraft longitudinal axis L varies. This is due to the fact that conventional helicopters lack a translational thrust system 40 for use during cruise mode, or forward flight. In a conventional helicopter, forward flight is provided through cyclic pitch, which causes the aircraft to point nose down. As this nose down orientation is undesirable beyond a certain angle, the angle between the main axis of rotation of the rotor system and the aircraft longitudinal axis L is adjusted to bring the nose upwards, while still in forward flight.

By contrast, aircraft 10, with translational thrust system 40, does not need to adjust the angle between the main axis of rotation of the rotor system (e.g., axis A in FIG. 1) and aircraft longitudinal axis L. The angle between the main axis of rotation of the rotor system (e.g., axis A in FIG. 1) and aircraft longitudinal axis L for aircraft 10 remains fixed during all flight modes, including take-off, cruise, landing, etc, unless otherwise commanded by a pilot of the aircraft 10.

Figure 9:
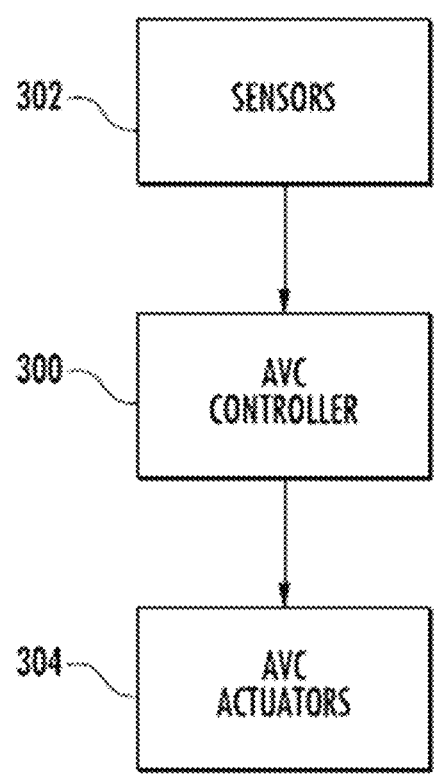
FIG. 9 depicts an active vibration control (AVC) system in an exemplary embodiment.

Aircraft 10 may employ an active vibration control (AVC) system to reduce vibration in the airframe 12. The use of a dual rotor, rigid rotor system tends to produce significant vibration in the airframe 12 and its systems. FIG. 9 depicts an AVC system in an exemplary embodiment. An AVC controller 300 executes an AVC control process to reduce vibration in aircraft 10. AVC controller 300 may be implemented as part of flight control system 120, executed by FCC 124, or may be a separate controller. One or more sensors 302 are located in aircraft 10 to detect vibration. Sensors may be located in a wide variety of positions, including airframe 12, gearbox 26, tail section 14, on main rotor assembly 18, cockpit, etc. It is understood that these locations are exemplary, and the AVC sensors 302 may be located in any position. AVC actuators 304 generate a force to dampen vibration in aircraft 10, as known in the art. AVC actuators 304 may be located in any position in the aircraft.

In operation, AVC controller 300 receives vibration signals from the AVC sensors 302. AVC controller 300 provides control signals to the AVC actuators 304 to generate forces to reduce the vibration sensed by the AVC sensors 302. Control signals to the AVC actuators 304 may vary in magnitude and frequency to cancel vibrations in aircraft 10. In an exemplary embodiment, AVC controller 300 operates in a feedback mode, where the control signals to AVC actuators 304 are adjusted in response to measured vibration from AVC sensors 302. In an alternate embodiment, AVC controller 300 does not actively measure vibration through AVC sensors 302. Rather, the AVC controller 300 obtains the rotor speed (e.g., through an RPM signal) and applies a control signal to the AVC actuators 304, in an open loop control mode.

The use of independently controlled upper rotor assembly 28 and the lower rotor assembly 32, along with other control surfaces, provides the ability to control yaw using a variety of elements. For example, below a first speed, (e.g., 40 knots), the FCC 124 uses differential collective pitch for yaw control. Above the first speed but below a second speed (e.g., 80 knots), a mix of differential collective and differential cyclic may be used to control yaw. The differential cyclic may be applied along the longitudinal and/or lateral axes of the aircraft. Further, wind direction may be measured by a sensor 122 and used to adjust the differential cyclic about the longitudinal and/or lateral axes. Above the second speed (e.g., 80 knots), the active rudders 45 are used as controllable surfaces to control yaw. The FCC 124 provides commands to the tail fairing interface 132 to control the rudders 45 to adjust yaw.

The use of active elevator 43, with independent control of a left elevator section and a right elevator section, provides for improved stability control. Flight control system 120 performs mixing of collective pitch of main rotor assembly 18 and an angle of elevator 43 to provide stability augmentation.

Figure 6A:
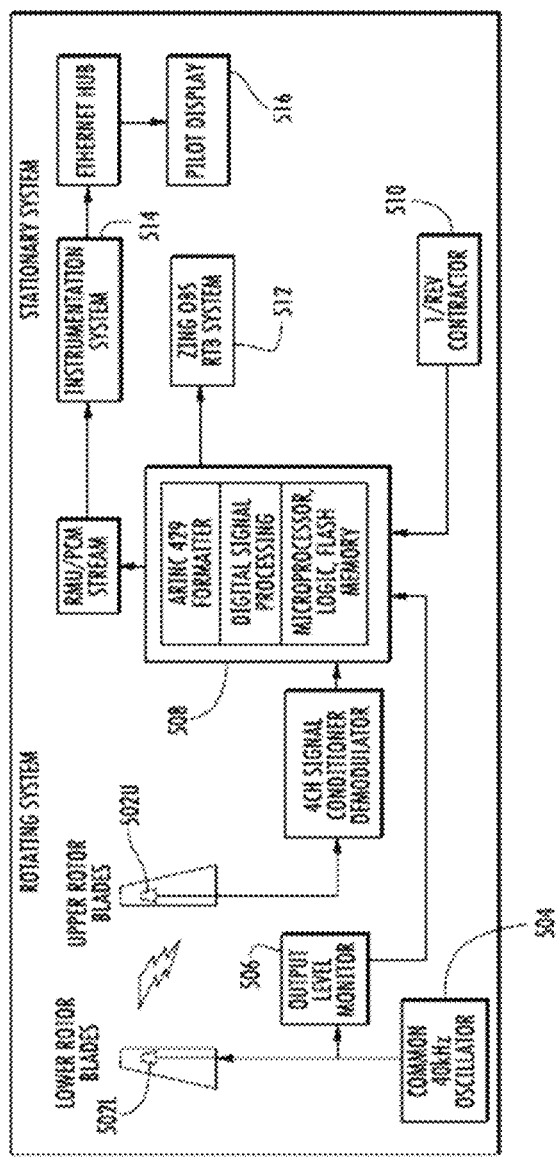
FIG. 6A depicts a blade proximity detection system in an exemplary embodiment.

Embodiments may use wireless techniques to provide tip clearance measurements. FIG. 6A depicts a blade proximity monitoring system in an exemplary embodiment. At least one upper rotor blade and at least one lower rotor blade is equipped with at least one antenna 502. Antennas 502 may be electric field antennas or magnetic field antennas. Antennas 502 may be implemented using compact ferrite core or small diameter magnet wire in the form of coils around the blade spar or embedded in the plane of the blade skin. The antennas 502 interact through the near field effect.

An oscillator 504 sends an excitation signal (e.g., 40 KHz) to a first antenna 502L. It is understood that the excitation signal may be sent to a plurality of antennas in different blades, including multiple antennas in the same blade. As the blades cross, a second antenna, 502U, receives a signal emitted by the first antenna 502 L. An output level monitor 506 measures the magnitude of the excitation signal.

A blade proximity monitor 508 (e.g., a processor implemented controller) is mounted in the rotating system, e.g., in a rotor hub. This eliminates noise that may be introduced through a conventional slip ring used to convey signals from a rotating system to a stationary system. The blade proximity monitor 508 receives an output signal from the second antenna 502U and the magnitude of the excitation signal from the output level monitor 506. Output signal from the second antenna 502U may be amplified. The blade proximity monitor 508 also receives a RPM signal of the main rotor assembly 18 from a contactor 510. Based on the magnitude of the excitation signal applied to the first antenna 502L and the magnitude of the output signal from the second antenna 502U, blade proximity monitor 508 can detect the distance between the first antenna 502L and the second antenna 502U. This provides an indication of the distance between the rotor blades. The larger the magnitude of the output signal from second antenna 502U, the closer the blades.

The blade proximity monitor 508 may output the measured distance between the blades to a rotor track and balance unit 512. The blade proximity monitor 508 may output the measured distance between the blades to instrument system 514 and to a pilot display 516. If the measured distance goes below a threshold, then an alert may be generated to the pilot that the blades of the upper rotor assembly 28 and the lower rotor assembly 32 are too close to each other.

The use of a dual rotor, main rotor assembly 18 allows improvements in control of main rotor assembly 18. Flight control system 120 may apply different control envelopes to the upper rotor assembly 28 and the lower rotor assembly 32. Flight control system 120 may impose different control ranges the upper rotor assembly 28 and the lower rotor assembly 32 including control elements such as prioritization, gain vs. differential, collective versus cyclic, etc. The upper rotor assembly 28 and the lower rotor assembly 32 may be independently controlled through the use of separate upper and lower swashplates. Alternatively, the upper rotor assembly 28 and the lower rotor assembly 32 may be independently controller using individual blade control (IBC) techniques.

Aircraft 10 employs a fly-by-wire (FBW) control system to reduce pilot work load. In an exemplary embodiment, FCC 124 determines the aircraft airspeed based on one or more sensors 122. The FCC 124 then adjusts the collective pitch of the upper rotor assembly 28 and/or the lower rotor assembly 32 in response to the airspeed. FCC 124 may use a look up table that indexes airspeed to collective pitch. Alternatively, FCC 124 may use an algorithm to compute the collective pitch based on airspeed. As noted above, the collective pitch of upper rotor assembly 28 and the lower rotor assembly 32 may be the same or different.

Another feature to reduce pilot workload includes automatically adjusting the RPM and/or pitch of propeller 42 in response to a velocity or acceleration command from the pilot. Conventional systems would require the pilot to adjust propeller RPM and/or pitch through individual inputs. The flight control system 120 allows the pilot to enter a desired velocity or an acceleration, and the FCC 124 generates the proper commands to the translational thrust interface 130 to establish an RPM and/or pitch to meet the desired velocity or acceleration.

In exemplary embodiments, the flight control system 120 controls the main rotor assembly 18 to prevent the tips of rotor blades 36 from exceeding a threshold speed. In exemplary embodiments, the threshold speed may be Mach 0.9. This threshold would prevent the rotor blade tips from exceeding the speed of sound. The threshold speed may vary, and may be set to limit drag on the rotor blades to below a certain level. In one embodiment, the FCC 124 determines air temperature from sensors 122. FCC 124 may also determine prevailing wind speed and direction from sensors 122. The FCC 124 then computes the threshold speed based on the speed of sound (e.g., Mach 1) at the sensed air temperature. The FCC 124 may set the threshold to Mach 0.9, for example. FCC 124 then controls RPM of the main rotor assembly 18 to prevent the rotor blade tips from exceeding the threshold. In an exemplary embodiment, the FCC maintain 85% of the nominal rotor RPM. FCC 124 may take into account prevailing wind direction and speed in controlling the RPM of the main rotor assembly 18. The Mach 0.9 threshold is only one example, and other speed thresholds may be employed to achieve desired results (e.g., reduce drag).

In exemplary embodiments, active elevator 43 is configured and controlled to improve stability by compensating for forces such as propeller torque and/or rotor downwash. Elevator 43 includes a left elevator and a right elevator on opposite sides of the axis of rotation of the propeller 42. The left elevator and right elevator may be independently controlled to assume different positions. The tail fairing interface 132 is configured to receive commands from the FCC 124 to control one or more actuators, such as a mechanical-hydraulic or electric actuators, to position the left elevator and right elevator independently. This independent control of the left elevator and right elevator aids in compensating propeller torque and/or rotor downwash.

The left elevator and right elevator may also have different physical configurations to compensate for compensating propeller torque and/or rotor downwash. The left elevator and right elevator may be offset relative to each other along the longitudinal and/or lateral axes of aircraft 10. Further, the left elevator and right elevator may have different geometries where one of the left elevator and right elevator is larger than the other along the longitudinal and/or lateral axes of aircraft 10. The left elevator and right elevator may have differing aerodynamic surfaces (e.g., airfoils) as well.

The cockpit of aircraft includes a single, semi-active, collective input (e.g., stick) positioned between the two pilot seats.

Figure 8A:
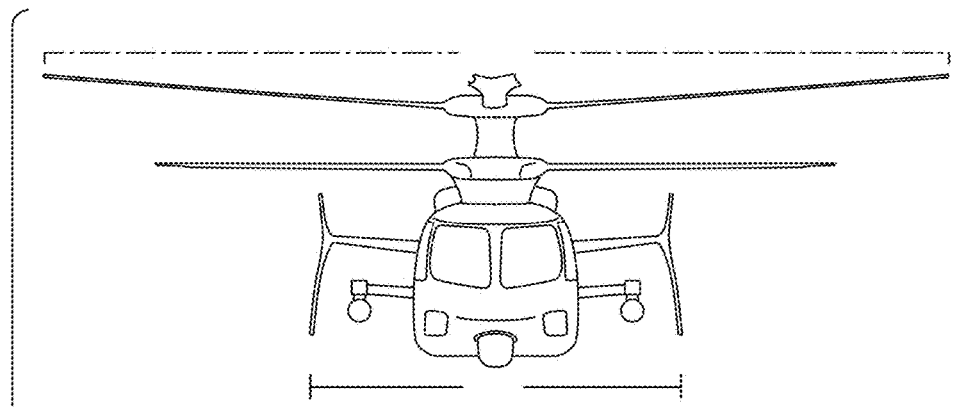
FIG. 8A depicts a front view of an aircraft in an exemplary embodiment.
Figure 8B:
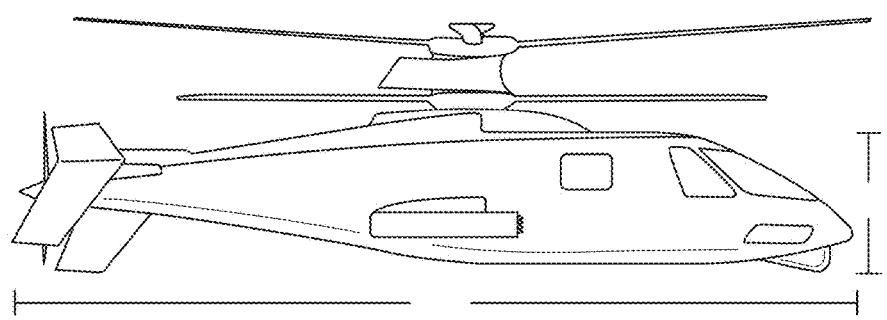
FIG. 8B depicts a side view of an aircraft in an exemplary embodiment.
Figure 8C:
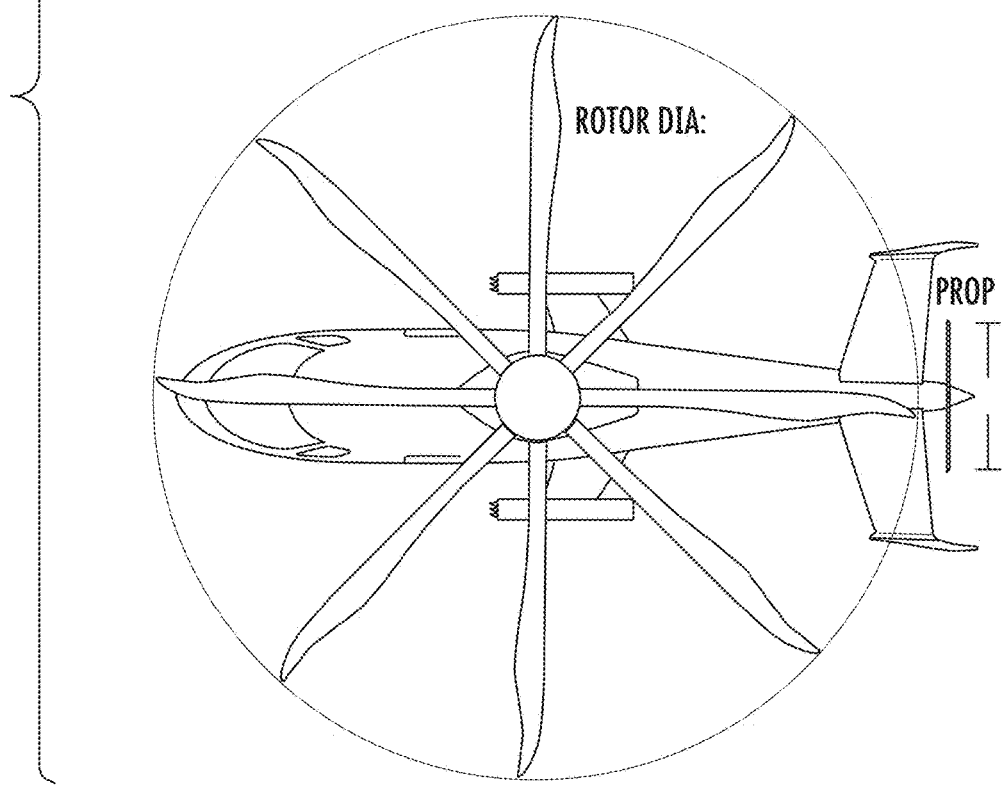
FIG. 8C depicts a top view of an aircraft in an exemplary embodiment.

Exemplary embodiments of aircraft 10 provide a much smaller footprint than existing aircraft. This makes aircraft 10 well suited for missions in confined terrain, urban settings, and shipboard operations. FIG. 8 presents front, side and top views of an exemplary aircraft. One feature contributing to the reduced footprint is the location of the main rotor shaft relative to the airframe 12. As shown in FIG. 1, the axis of rotation A, of the main rotor assembly 18, intersects longitudinal axis, L, along a span of axis L, extending from the nose of the aircraft to the tip of the hub of propeller 42. In an exemplary embodiment, the axis of rotation A is located at about a 44% station (STA) of the fuselage or airframe 12.

In an exemplary embodiment, there is about 5.2 inches from the main rotor pylon to the blade hub centerline. In an exemplary embodiment, there is about 0.7 inch hub clearance to the main rotor pylon. In an exemplary embodiment, the rotor blades 36 extend beyond the nose of the aircraft by about 13 inches (0.33 meters). In an exemplary embodiment, rotor blades 36 extend beyond the nose of the aircraft by about 6.9% of the blade span, which may be about 188 inches.

The use of a rigid rotor system, along with the rotor shaft position (e.g., axis A) allows for much easier air-to-air refueling. The stiff rotor blades 36 ease air-to-air refueling by reducing blade flapping, which may result in a blade contacting a tanker fuel line during refueling.

Aircraft 10 provides an improved glide slope ratio of about 5-to-1 to about 6-to-1. This is due to the propeller 42 taking energy out of the airstream, inputting energy into the gear box 26 to increase the speed of the main rotor assembly 18 during autorotation. As shown in FIGS. 3 and 4, the main gear box 26 interconnects the main rotor assembly 18 and propeller 42. During autorotation, the airflow rotates propeller 42, which will subsequently rotate the main rotor assembly 18 and thus increase lift. Propeller 42 also helps stabilize aircraft 10 during decent by acting like a parachute and a rudder, both slowing aircraft 10 and helping to direct aircraft 10 to maintain control. The ability to fly aircraft 10 in a nose down attitude also improves glide slope ratio.

In an exemplary embodiment, the distance between the hub of the upper rotor assembly 28 and the hub of the lower rotor assembly 32 ranges from about 2 feet to about 2.5 feet. In another exemplary embodiment, the distance between the hub of the upper rotor assembly 28 and the hub of the lower rotor assembly 32 ranges from about 2.1 feet to about 2.4 feet. In another exemplary embodiment, the distance between the hub of the upper rotor assembly 28 and the hub of the lower rotor assembly 32 is about 2.29 feet. In another exemplary embodiment, the distance between a midpoint of a blade in the upper rotor assembly 28 and a midpoint of a blade in the lower rotor assembly 32 is about 29.0 inches. In another exemplary embodiment, the distance between a tip of a blade in the upper rotor assembly 28 and a tip of a blade in the lower rotor assembly 32 is about 31.0 inches. In another exemplary embodiment, the distance between the hub of the upper rotor assembly 28 and the hub of the lower rotor assembly 32 is about 14% of the blade span, which may be about 188 inches.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description.

What is claimed is:

1. An aircraft comprising:
   an airframe;
   an extending tail;
   a counter rotating, coaxial main rotor assembly including an upper rotor assembly and a lower rotor assembly;
   a translational thrust system positioned at the extending tail, the translational thrust system providing translational thrust to the airframe;
   an upper hub fairing positioned at the upper rotor assembly;
   a lower hub fairing positioned at the lower rotor assembly; and
   a shaft fairing disposed between the upper hub fairing and the lower hub fairing;
   wherein the upper hub fairing is substantially sealed to the shaft fairing and the lower hub fairing is substantially sealed to the shaft fairing.

2. The aircraft of claim 1 wherein, the upper hub fairing is contoured to match an upper surface of the shaft fairing.

3. The aircraft of claim 1 wherein, the lower hub fairing is contoured to match a lower surface of the shaft fairing.

4. The aircraft of claim 1 wherein:
   the shaft fairing is generally airfoil shaped.

5. The aircraft of claim 4 wherein, the shaft fairing is shaped to minimize drag.

6. The aircraft of claim 1 wherein, the upper hub fairing, lower hub fairing and shaft fairing are disposed about an axis of rotation of the main rotor assembly.

7. The aircraft of claim 1 wherein, at least 80% of the shaft fairing length is located aft of the axis of rotation of the main rotor assembly.

8. The aircraft of claim 7 wherein, at least 85% of the shaft fairing length is located aft of the axis of rotation of the main rotor assembly.

9. The aircraft of claim 1 wherein, the upper hub fairing, the shaft fairing and the lower hub fairing are coated with a conductive material.

10. The aircraft of claim 1 wherein, the main rotor assembly is a rigid rotor system.

* * * * *